United States Patent
Baik et al.

(10) Patent No.: US 10,394,570 B2
(45) Date of Patent: *Aug. 27, 2019

(54) METHOD OF GENERATING BOOT IMAGE FOR FAST BOOTING AND IMAGE FORMING APPARATUS FOR PERFORMING THE METHOD, AND METHOD OF PERFORMING FAST BOOTING AND IMAGE FORMING APPARATUS FOR PERFORMING THE METHOD

(71) Applicant: HP PRINTING KOREA CO., LTD., Suwon-si, Gyeonggi-Do (KR)

(72) Inventors: Kun-hoon Baik, Seoul (KR); Ji-sub Park, Suwon-si (KR); Joung-hoon Choo, Yongin-si (KR); Hyun-suk Lee, Suwon-si (KR)

(73) Assignee: HP PRINTING KOREA CO., LTD., Suwon-Si (KR)

( * ) Notice: Subject to any disclaimer, the term of this patent is extended or adjusted under 35 U.S.C. 154(b) by 464 days.

This patent is subject to a terminal disclaimer.

(21) Appl. No.: 13/650,752

(22) Filed: Oct. 12, 2012

(65) Prior Publication Data

US 2013/0042098 A1  Feb. 14, 2013

Related U.S. Application Data

(63) Continuation-in-part of application No. 13/036,865, filed on Feb. 28, 2011, now abandoned.

(30) Foreign Application Priority Data

Feb. 26, 2010 (KR) .................. 10-2010-0018237
Oct. 14, 2011 (KR) .................. 10-2011-0105528

(51) Int. Cl.
G06F 9/00  (2006.01)
G06F 15/177  (2006.01)
(Continued)

(52) U.S. Cl.
CPC .............. *G06F 9/4401* (2013.01); *G06F 9/24* (2013.01); *G06F 9/44* (2013.01); *G06F 9/442* (2013.01);
(Continued)

(58) Field of Classification Search
USPC .............................................................. 713/2
See application file for complete search history.

(56) References Cited

U.S. PATENT DOCUMENTS 5,325,532 A  6/1994 Crosswy et al.
5,519,869 A  5/1996 Payne et al.
(Continued)

FOREIGN PATENT DOCUMENTS

CN  101515239  8/2009
JP  2003-84977  3/2003
(Continued)

OTHER PUBLICATIONS

U.S. Appl. No. 13/650,715—Amendment of Claims in Response Filed Sep. 9, 2015.*
(Continued)

*Primary Examiner* — Tanh Q Nguyen
(74) *Attorney, Agent, or Firm* — Staas & Halsey LLP

(57) ABSTRACT

A method of generating a boot image for fast booting an image forming apparatus. In the method, a boot image is generated to contain information regarding a system state after processes that are not used to execute an operating system and at least one application are terminated. Then, the image forming apparatus is fast booted using the boot image.

21 Claims, 19 Drawing Sheets

(51) Int. Cl.
   *G06F 9/4401* (2018.01)
   *G06F 9/445* (2018.01)
   *G06F 9/24* (2006.01)
   *G06F 9/44* (2018.01)

(52) U.S. Cl.
   CPC ............ *G06F 9/4403* (2013.01); *G06F 9/445* (2013.01); *G06F 9/4406* (2013.01); *G06F 9/4418* (2013.01); *G06F 9/00* (2013.01)

(56) References Cited

U.S. PATENT DOCUMENTS

| | | |
|---|---|---|
| 5,557,777 A | 9/1996 | Culbert |
| 5,933,631 A | 8/1999 | Mealey et al. |
| 6,098,158 A | 8/2000 | Lay et al. |
| 6,507,881 B1 | 1/2003 | Chen |
| 6,507,906 B1* | 1/2003 | Criddle ............... G06F 9/4401 710/10 |
| 6,609,182 B1 | 8/2003 | Pedrizetti et al. |
| 6,611,919 B1 | 8/2003 | Matsuya et al. |
| 6,754,817 B2* | 6/2004 | Khatri ............... G06F 9/4411 710/301 |
| 7,249,353 B2 | 7/2007 | Zarco |
| 7,360,013 B2 | 4/2008 | Fujita et al. |
| 7,487,343 B1* | 2/2009 | Insley ............... G06F 9/441 713/1 |
| 7,532,339 B1 | 5/2009 | Beard et al. |
| 8,341,385 B2 | 12/2012 | Asai |
| 8,386,757 B1 | 2/2013 | Midgley et al. |
| 8,654,372 B2 | 2/2014 | Ukegawa |
| 8,694,824 B2 | 4/2014 | Howard |
| 8,914,653 B2* | 12/2014 | Yi ............... G06F 9/4418 713/320 |
| 8,997,079 B2 | 3/2015 | Kuroki |
| 9,354,895 B2 | 5/2016 | Lim et al. |
| 2001/0039612 A1 | 11/2001 | Lee |
| 2002/0016909 A1 | 2/2002 | Miyajima |
| 2002/0073304 A1 | 6/2002 | Marsh et al. |
| 2002/0078266 A1 | 6/2002 | Watanabe et al. |
| 2002/0078338 A1 | 6/2002 | Lay et al. |
| 2003/0035140 A1 | 2/2003 | Tomita et al. |
| 2005/0015582 A1 | 1/2005 | Shida et al. |
| 2005/0060531 A1 | 3/2005 | Davis et al. |
| 2005/0090458 A1 | 4/2005 | Pitterna |
| 2005/0193232 A1 | 9/2005 | Diehl |
| 2006/0070055 A1 | 3/2006 | Hodder et al. |
| 2006/0218361 A1 | 9/2006 | Ehrlich et al. |
| 2006/0282654 A1 | 12/2006 | Veen et al. |
| 2007/0067679 A1 | 3/2007 | Deobald |
| 2007/0083743 A1* | 4/2007 | Tsang ............... G06F 9/4418 713/1 |
| 2007/0124573 A1 | 5/2007 | Walker et al. |
| 2007/0250730 A1 | 10/2007 | Reece et al. |
| 2007/0260868 A1 | 11/2007 | Azzarello et al. |
| 2008/0005541 A1 | 1/2008 | Hase et al. |
| 2008/0091929 A1 | 4/2008 | Oberhaus et al. |
| 2008/0162919 A1* | 7/2008 | Zimmer ............... G06F 9/4406 713/2 |
| 2008/0316522 A1 | 12/2008 | Yokoyama et al. |
| 2009/0178141 A1 | 7/2009 | Panasyuk |
| 2009/0307480 A1 | 12/2009 | Katoh |
| 2010/0037076 A1 | 2/2010 | Reece et al. |
| 2010/0100719 A1 | 4/2010 | Chen et al. |
| 2010/0174934 A1 | 7/2010 | Zhao et al. |
| 2011/0037993 A1* | 2/2011 | Lee ............... G06F 9/4418 358/1.14 |
| 2011/0055541 A1 | 3/2011 | Lee et al. |
| 2011/0213954 A1 | 9/2011 | Baik et al. |
| 2011/0239208 A1 | 9/2011 | Jung et al. |
| 2011/0246715 A1 | 10/2011 | Doran et al. |
| 2012/0054540 A1* | 3/2012 | Howard ............... G06F 9/4401 714/6.12 |
| 2012/0066546 A1 | 3/2012 | Kim |
| 2012/0072897 A1 | 3/2012 | Selvam |
| 2012/0210115 A1 | 8/2012 | Park et al. |
| 2012/0239918 A1* | 9/2012 | Huang ............... G06F 9/4401 713/2 |
| 2013/0036300 A1 | 2/2013 | Baik et al. |
| 2013/0042097 A1 | 2/2013 | Baik et al. |
| 2013/0042098 A1* | 2/2013 | Baik ............... G06F 9/4401 713/2 |
| 2013/0047031 A1* | 2/2013 | Tabone ............... G06F 11/1417 714/15 |
| 2013/0074060 A1 | 3/2013 | Kim |
| 2013/0086372 A1* | 4/2013 | Kojo ............... G06F 1/24 713/2 |
| 2014/0129820 A1 | 5/2014 | Lim et al. |

FOREIGN PATENT DOCUMENTS

| | | |
|---|---|---|
| JP | 2007-293401 | 11/2007 |
| JP | 2008-165554 | 7/2008 |
| JP | 2009-193379 | 8/2009 |
| KR | 10-1999-0011346 | 2/1999 |
| KR | 10-2001-0053904 | 7/2001 |
| KR | 10-2011-0098567 | 9/2011 |
| WO | 94/08288 | 4/1994 |

OTHER PUBLICATIONS

U.S. Office Action dated Jan. 2, 2015 in U.S. Appl. No. 13/650,715.
U.S. Office Action dated Mar. 2, 2015 in U.S. Appl. No. 13/036,865.
U.S. Office Action dated Mar. 18, 2015 in U.S. Appl. No. 13/650,727.
U.S. Office Action dated Nov. 4, 2014 in U.S. Appl. No. 14/056,404.
European Examination Report dated Mar. 5, 2014 in European Patent Application No. 13187539.5.
European Search Report dated Feb. 20, 2014 in European Patent Application No. 13187539.5.
Kunhoon Baik et al., "Boosting up Embedded Linux device: experience on Linux-based Smartphone", Proceedings of the Linux Symposium, 2010, 12 pages.
U.S. Advisory Action dated May 20, 2014 in U.S. Appl. No. 13/036,865.
International Search Report and Written Opinion of the International Searching Authority dated Feb. 28, 2013 issued in International Patent Application No. PCT/KR2012/007439.
U.S. Office Action dated Jun. 10, 2015 in U.S. Appl. No. 13/650,715.
U.S. Office Action dated Jun. 18, 2014 in U.S. Appl. No. 13/036,865.
Hiroki Kaminaga, "Improving Linux Startup Time Using Software Resume (and other techniques)" Jul. 2006.
U.S. Appl. No. 13/036,865, filed Feb. 28, 2011, Kun-Hoon Baik et al., Samsung Electronics Co., Ltd.
U.S. Appl. No. 13/650,715, filed Oct. 12, 2012, Baik et al., Samsung Electronics Co., Ltd.
U.S. Appl. No. 13/650,727, filed Oct. 12, 2012, Baik et al., Samsung Electronics Co., Ltd.
Extended European Search Report dated Sep. 4, 2014 in European Application No. 11747750.5.
Chinese Office Action dated Jul. 29, 2014 in Chinese Patent Application No. 201180010999.2.
U.S. Office Action dated Oct. 20, 2014 in U.S. Appl. No. 13/036,865.
Tim R. Bird, "Methods to Improve Bootup Time in Linux," In Proc. of the Linux Symposium, 2004, 12 pages.
A. Leonard Brown, et al. "Suspend-to-RAM in Linux," In Proc. of the Linux Symposium, 2008, 16 pages.
Heeseung Jo, et al. "Improving the Startup Time of Digital TV," IEEE Transactions on Consumer Electronics, vol. 52, Issue 2, May 2009, 7 pages.
Kunhoon Baik, et al. "Boosting up Embedded Linux device: experience on Linux-based Smartphone", Proc. of the Linux Symposium, 2010, 12 pages.
CELF—Boot Time, http://eLinux.org/Boot\_Time, Last modified 2014, 9 pages.
Uncompressed Kernel, http://elinux.org/Uncompressed\_kernel, Last modified 2011, 1 page.
Fast Kernel Decompression, http://elinux.org/Fast\_Kernel\_Decompression, Last modified 2011, 4 pages.

(56) References Cited

OTHER PUBLICATIONS

Disable console, http://elinux.org/Disable\_Console, Last modified 2008, 3 pages.
Preset LPJ, http://elinux.org/Preset\_LPJ, Last modified 2008, 5 pages.
Deferred Initcalls, http://elinux.org/Deferred\_Initcalls, Last modified 2013, 3 pages.
Ramzswap, http://code.google.com/p/compcache/, 3 pages.
UBI—Unsorted Block Images, http://www.linux-mtdinfradead.org/doc/ubi.html, Last modified 2009, 13 pages.
UBIFS—UBI File-System, http://www.linux-mtd.infradead.org/doc/ubifs.html, Last modified 2008, 15 pages.
UCL, http://www.oberhumer.com/opensource/ucl/, Version 1.03, Last modified 2004, 1 pages.
International Search Report and Written Opinion of the International Searching Authority dated Sep. 29, 2011 issued in International Patent Application No. PCT/KR2011/001362.
U.S. Office Action dated Jul. 11, 2013 in U.S. Appl. No. 13/036,865.
U.S. Office Action dated Sep. 26, 2013 in U.S. Appl. No. 13/036,865.
U.S. Appl. No. 14/056,404, filed Oct. 17, 2013, Kang-hee Lim et al., Samsung Electronics Co., Ltd.
Japanese Office Action dated Feb. 9, 2015 in Japanese Patent Application No. 2012-554941.
U.S. Office Action dated May 5, 2015 in U.S. Appl. No. 14/056,404.
U.S. Advisory Action dated Aug. 13, 2015 in U.S. Appl. No. 14/056,404.
U.S. Office Action dated Jul. 6, 2015 in U.S. Appl. No. 13/650,727.
U.S. Office Action dated Dec. 1, 2015 in U.S. Appl. No. 13/650,715.
U.S. Notice of Allowance dated Feb. 23, 2016 in U.S. Appl. No. 14/056,404.
Lee et al., Fast booting based on nand flash memory, Oct. 2012, 2 pages.
Singh et al., Optimizing the boot time of Android on embedded system, 2011, 6 pages.
Korean Office Action dated Dec. 17, 2015 in Korean Patent Application No. 10-2010-0018237.
U.S. Office Action dated Mar. 30, 2016 in U.S. Appl. No. 13/650,715.
U.S. Office Action dated Oct. 28, 2015 in U.S. Appl. No. 14/056,404.
U.S. Advisory Action dated May 31, 2016 and Examiner-Initiated Interview Summary dated May 24, 2016 in U.S. Appl. No. 13/650,715.
U.S. Office Action dated Aug. 11, 2016 in U.S. Appl. No. 13/650,715.
U.S. Office Action dated Mar. 28, 2017 in co-pending U.S. Appl. No. 13/650,715.
U.S. Office Action dated Dec. 2, 2016 in U.S. Appl. No. 13/650,715.
U.S. Office Action dated Mar. 10, 2014 in U.S. Appl. No. 13/036,865.
Korean Office Action dated Mar. 22, 2017 in corresponding Korean Patent Application No. 10-2011-105528.
Korean Office Action dated Mar. 22, 2017 in corresponding Korean Patent Application No. 10-2011-105529.
Final Office Action dated Aug. 11, 2017 in co-pending U.S. Appl. No. 13/650,715.

* cited by examiner

METHOD OF GENERATING BOOT IMAGE FOR FAST BOOTING AND IMAGE FORMING APPARATUS FOR PERFORMING THE METHOD, AND METHOD OF PERFORMING FAST BOOTING AND IMAGE FORMING APPARATUS FOR PERFORMING THE METHOD

CROSS-REFERENCE TO RELATED APPLICATIONS

This application is a Continuation-In-Part of U.S. patent application Ser. No. 13/036,865 filed on Feb. 28, 2011 (US Patent Application Publication No. 2011/0213954 published on Sep. 1, 2011), the entire disclosure of which is incorporated herein by reference including Korean Patent Application No. 10-2010-0018237 filed on Feb. 26, 2010 in the Korean Intellectual Property Office from which priority is also claimed. This application claims the priority benefit of Korean Patent Application No. 10-2011-0105528, filed on Oct. 14, 2011, in the Korean Intellectual Property Office, the disclosure of which is incorporated herein in its entirety by reference.

BACKGROUND

1. Field

Embodiments relate to a method of generating a boot image for fast booting and an image forming apparatus for performing the method, and a method of performing fast booting and an image forming apparatus for performing the method.

2. Description of the Related Art

Recently, various hardware functions of electronic products have been replaced with software functions thereof. This is because advancement in hardware technologies has reduced restrictions to software. However, as various functions have been provided using software, software capacity has been increased and software processing has become complicated. Software has been efficiently developed using various types of middleware, but the more types of software used, the slower a system booting time/speed of an electronic product. Although a system booting time varies according to system type, a personal computer (PC) or a server system has a very long booting time for initializing device drivers therein and the system, thus causing a waste of energy or time. Also, a system booting speed has been an important issue for not only computers and server systems but also other electronic products having various functions, such as digital televisions, mobile communication terminals, and navigators. In recent years, the speeds of booting electronic products range from about several seconds to several minutes.

SUMMARY

In an aspect of one or more embodiments, there is provided a method of generating a boot image for fast booting and an image forming apparatus for performing the method, and a method of performing fast booting and an image forming apparatus for performing a method.

In an aspect of one or more embodiments, there is provided a computer readable recording medium having recorded thereon computer programs for respectively performing the methods.

According to an aspect of one or more embodiments, there is provided a method of generating a boot image for fast booting an image forming apparatus, the method including initializing an operating system and at least one application installed in the image forming apparatus, when booting of the image forming apparatus starts; terminating processes that are not used to execute the operating system and the at least one application, from among processes that are performed when the initializing is completed; suspending remaining processes performed in the image forming apparatus; and generating a boot image including information regarding a system state while the remaining processes are suspended.

According to an aspect of one or more embodiments, there is provided a method of fast booting an image forming apparatus by using a boot image, the method including starting booting of the image forming apparatus; loading a boot image stored before the booting starts, the boot image including information regarding a system state, after processes that are not used to execute an operating system and at least one application installed in the image forming apparatus are terminated from among processes that are performed when initializing of the operating system and the at least one application ends, and while the remaining processes performed in the image forming apparatus are suspended; and restoring the image forming apparatus to the system state defined in the boot image, based on the loaded boot image.

According to an aspect of one or more embodiments, there is provided a computer readable recording medium having recorded thereon a computer program for performing any one of the methods.

According to an aspect of one or more embodiments, there is provided an image forming apparatus for generating a boot image for fast booting, the apparatus including a processor for initializing an operating system and at least one application installed in the image forming apparatus, when booting of the image forming apparatus starts, terminating processes that are not used to execute the operating system and the at least one application from among processes that are performed when the initializing is completed, suspending the remaining processes performed in the image forming apparatus, and generating a boot image based on information regarding a system state while the remaining processes are suspended; and a nonvolatile memory for storing the generated boot image.

According to an aspect of one or more embodiments, there is provided an image forming apparatus for performing fast booting by using a boot image, the apparatus including a nonvolatile memory for storing the boot image; and a processor for starting booting of the image forming apparatus and loading the boot image into a volatile memory, the boot image being pre-stored in the nonvolatile memory before the booting starts, wherein the boot image contains information regarding a system state, after processes that are not used to execute an operating system and at least one application installed in the image forming apparatus are terminated from among processes that are performed when initializing of the operating system and the at least one application ends and while the remaining processes performed in the image forming apparatus are suspended, wherein the processor boots the image forming apparatus by restoring the image forming apparatus to the system state defined in the boot image, based on the loaded boot image.

According to an aspect of one or more embodiments, there is provided at least one computer readable medium storing computer readable instructions to implement methods of embodiments.

BRIEF DESCRIPTION OF THE DRAWINGS

The above and other aspects will become more apparent by describing in detail embodiments thereof with reference to the attached drawings in which.

DETAILED DESCRIPTION

Embodiments will now be described more fully with reference to the accompanying drawings, in which embodiments are shown. As used herein, expressions such as "at least one of," when preceding a list of elements, modify the entire list of elements and do not modify the individual elements of the list.

Figure 1A:
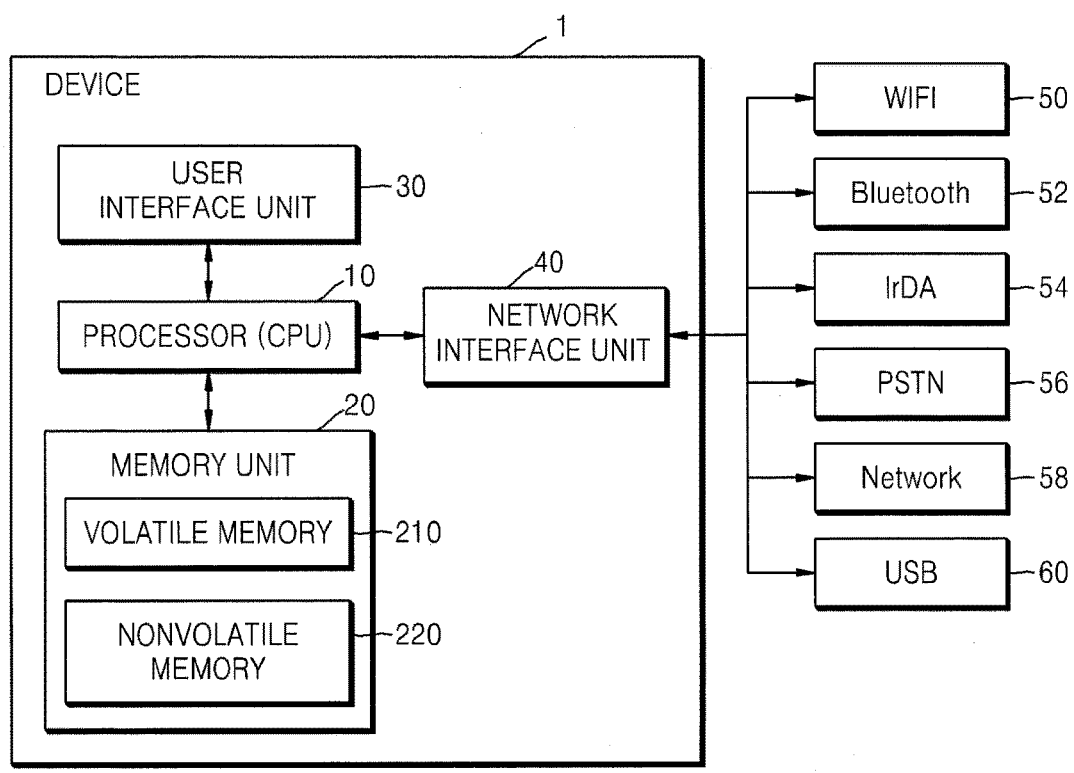
FIG. 1A is a block diagram of a device according to an embodiment.

FIG. 1A is a block diagram of a device 1 according to an embodiment. Referring to FIG. 1A, the device 1 includes a processor 10, a memory unit 20, a user interface unit 30, and a network interface unit 40.

For clarity, FIG. 1A illustrates only hardware components related to an embodiment. However, it will be apparent to those of ordinary skill in the art that the device 1 may further include other general hardware components.

In an embodiment, examples of the device 1 include various mobile devices, e.g., a mobile phone and a personal digital assistant (PDA), or various computing devices, e.g., a computer. Also, the device 1 may be an embedded device.

Figure 1B:
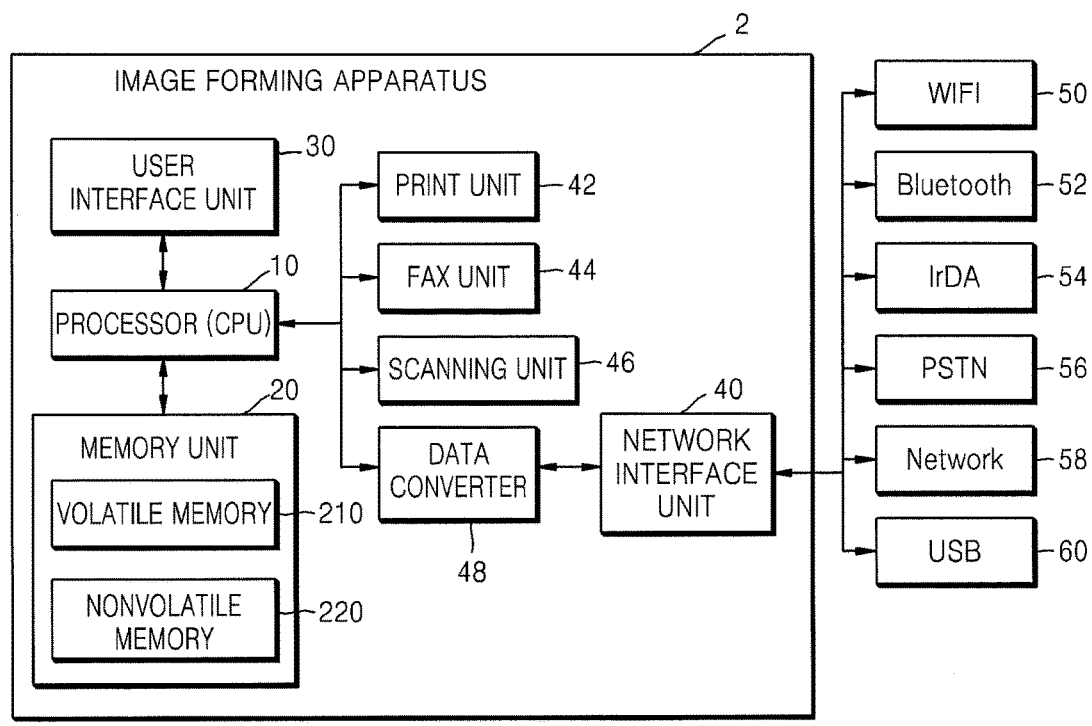
FIG. 1B is a block diagram of an image forming apparatus according to an embodiment.

FIG. 1B is a block diagram of an image forming apparatus 2 according to an embodiment. Referring to FIG. 1B, the image forming apparatus 2 includes a processor 10, a memory unit (memory) 20, a user interface unit (user interface) 30, a network interface unit (network interface) 40, a print unit (printer) 42, a fax unit 44, a scanning unit (scanner) 46, and a data converter 48. For clarity, FIG. 1B illustrates only hardware components related to an embodiment. However, it will be apparent to those of ordinary skill in the art that the image forming apparatus 2 may further include other general hardware components.

Referring to FIG. 1B, the image forming apparatus 2 is an example of the device 1 of FIG. 1A and thus also includes the processor 10, the memory unit 20, the user interface unit 30, and the network interface unit 40 included in the device 1. Hereinafter, the processor 10, the memory unit 20, the user interface unit 30, and the network interface unit 40 will be described as elements of the image forming apparatus 2. However, since the image forming apparatus 2 is an example of the device 1, a description about the image forming apparatus 2 may apply to the device 1.

In an embodiment, the image forming apparatus 2 includes a multi-functional peripheral (MFP) device capable of performing various functions, e.g., copying, printing, scanning, faxing, and emailing. The image forming apparatus 2 will now be described as an MFP device, but is not limited thereto and may be a single device, e.g., a printer, a scanner, or a fax machine.

The processor 10 is a central processing unit (CPU) that includes an operating system (OS) or an application installed in the image forming apparatus 2 based on data stored in the memory unit 20.

Figure 1C:
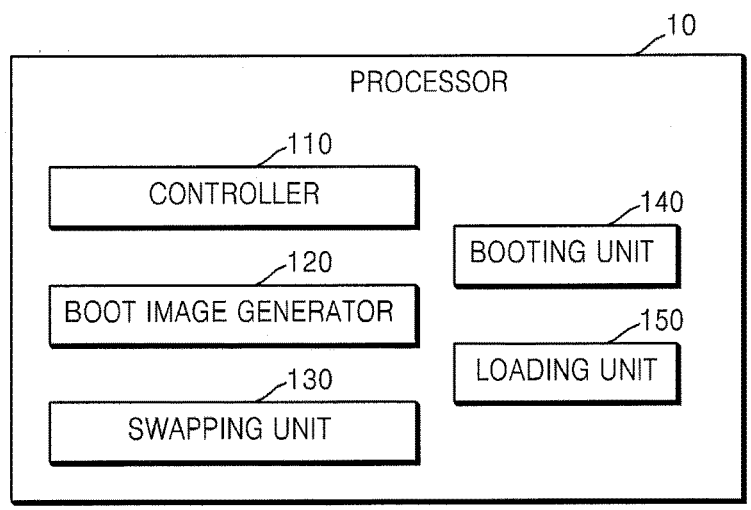
FIG. 1C is a block diagram specifically illustrating a structure of a processor according to an embodiment.

FIG. 1C is a block diagram specifically illustrating a structure of the processor 10 of FIG. 1A or 1B, according to an embodiment. Referring to FIG. 1C, the processor 10 includes a controller 110, a boot image generator 120, a swapping unit 130, a booting unit 140, and a loading unit 150. The processor 10 may be embodied as a plurality of logic gates or a general microprocessor. In other words, the processor 10 may be embodied as any of various hardware devices.

Referring back to FIG. 1A or 1B, the memory unit 20 includes a volatile memory 210 and a nonvolatile memory 220.

The volatile memory 210 reads data related to an OS or an application that runs in the image forming apparatus 2 from the nonvolatile memory 220 and then loads the data therein, thereby allowing the processor 10 to access the data. The volatile memory 210 is a main memory and may be a random access memory (RAM).

The nonvolatile memory 220 stores data for running an OS or an application in the image forming apparatus 2. The nonvolatile memory 220 may be a hard disk drive, Ferro-electric RAM (FRAM), Magneto-resistive RAM (MRAM), or Phase-change RAM (PRAM), in which data is retained even when the image forming apparatus 2 is powered off, unlike the volatile memory 210.

The user interface unit 30 receives information from a user via an information input device (not shown), e.g., a keyboard, a mouse, hardware buttons, a touch screen, e.g., a soft keyboard of a graphics user interface (GUI), or a speech recognition device. Also, the user interface unit 30 may provide a user with information, which is processed by the image forming apparatus 2, by using a device that displays visual information, e.g., a screen of a liquid crystal display (LCD) or a screen of a light-emitting device (LED), or a device that provides audio information, e.g., a speaker.

The network interface unit 40 communicates with a peripheral device of the image forming apparatus 2, an external device, or a network. For example, the image forming apparatus 2 may communicate with devices having WiFi 50 and Bluetooth 52 functions, be connected to a network 58, or communicate with peripheral devices, e.g., a Universal Serial Bus (USB) device 60, via the network interface unit 40. The image forming apparatus 2 may communicate with a Infrared Data Association (IrDA) network 54 and/or a Public Switch Telephone network (PSTN) 56.

When the image forming apparatus 2 is powered on, the image forming apparatus 2 is automatically booted using internal elements therein, e.g., the processor 10 and the memory unit 20. Furthermore, the image forming apparatus 2 may be fast booted using a boot image or may be booted while generating a boot image.

Here, the boot image is data including various information for booting the image forming apparatus 2 while restoring the image forming apparatus 2 to a system state at a particular point of time that the boot image was generated. The boot image may be generated in the form of a file. More specifically, the boot image contains information for restoring a system state when the image forming apparatus 2 is initially booted, and includes data stored in volatile memory and data stored in a CPU register. The boot image according to an embodiment may be referred to as a snapshot image.

Figure 2A:
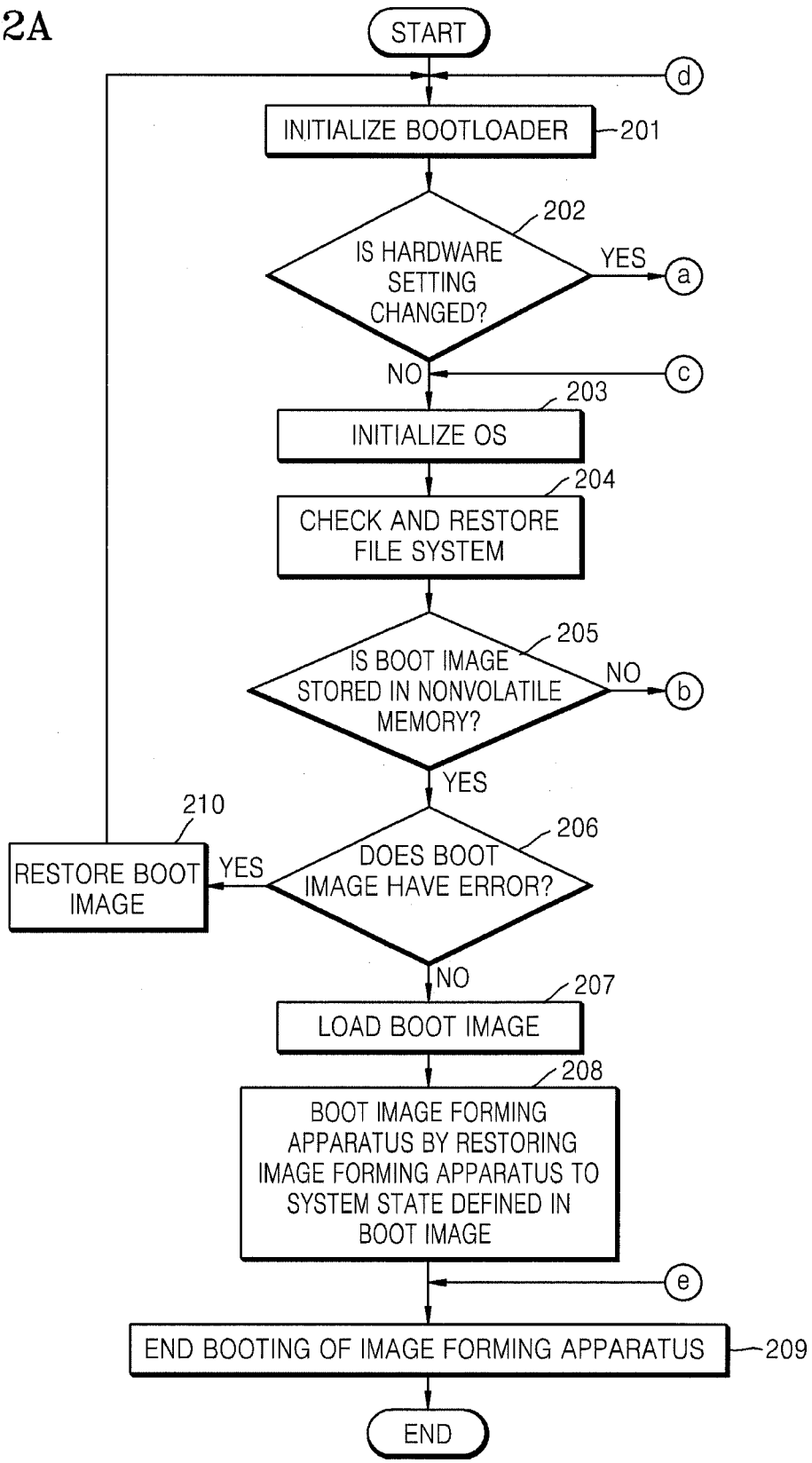
FIGS. 2A and 2B are flowcharts illustrating a method of booting an image forming apparatus, according to an embodiment.
Figure 2B:
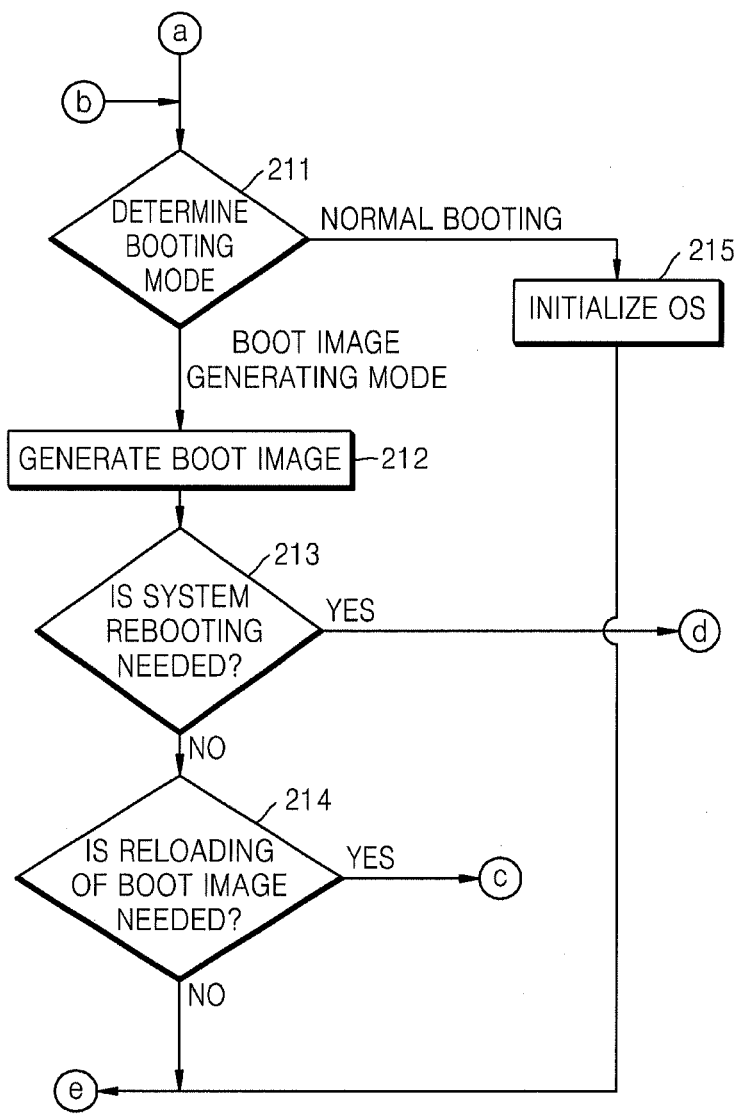

FIGS. 2A and 2B are flow charts illustrating a method of booting an image forming apparatus, according to an embodiment. The method of FIGS. 2A and 2B are performed by the image forming apparatus 2 of FIG. 1B.

In operation 201, when the image forming apparatus 2 is powered on, the processor 10 initializes a bootloader to start booting of the image forming apparatus 2.

In operation 202, the processor 10 determines whether the existing hardware (H/W) setting in the image forming apparatus 2 has changed. For example, the processor 10 determines whether there is a change in a setting of hardware, e.g., a scanning unit and a fax unit, in the image forming apparatus 2.

In operation 203, if it is determined in operation 202 that there is no change in the H/W setting, the processor 10 initializes an OS of the image forming apparatus 2.

In operation 204, the processor 10 checks and restores a file system stored in the nonvolatile memory 220. If it is determined that the file system has a defect, the processor 10 restores the file system to a normal state.

In operation 205, the processor 10 determines whether the nonvolatile memory 220 stores a boot image.

In operation 206, if it is determined in operation 205 that a boot image is stored, the processor 10 determines whether the boot image has an error.

In operation 207, if it is determined in operation 206 that the boot image has no error, the processor 10 loads the boot image stored in the nonvolatile memory 220 in the volatile memory 210.

In operation 208, the processor 10 boots the image forming apparatus 2 by restoring the image forming apparatus 2 to a system state defined in the boot image, based on the loaded boot image.

In operation 209, the processor 10 completes booting of the image forming apparatus 2.

In operation 210, if it is determined in operation 206 that the boot image has an error, otherwise, the processor 10 restores the stored boot image. Then, the processor 10 returns back to operation 201.

In operation 211, if it is determined in operation 202 that there is a change in the H/W setting, otherwise, the processor 10 determines a booting mode of the image forming apparatus 2. The booting mode may be a normal booting mode or a boot image generating mode. The normal booting mode refers to a cold booting mode that is well-known.

The user interface unit 30 may display a screen via which a user may select a desired booting mode and receive a user input regarding the selected booting mode. As described above, when a user input regarding the selected booting mode is received from the user via the user interface unit 30, the image forming apparatus 2 determines a booting mode based on the user input. According to an embodiment, the image forming apparatus 2 may receive a user input regarding the selected booting mode by communicating with an external device connected thereto via a network, via the network interface unit 40.

In operation 212, if it is determined in operation 211 that the booting mode of the image forming apparatus 2 is the boot image generating mode, the processor 10 generates a boot image.

In operation 213, the processor 10 determines whether system rebooting is needed, for example, according to a state of the image forming apparatus 2. If it is determined that system rebooting is needed, the processor 10 returns back to operation 201.

In operation 214, if it is determined in operation 213 that system rebooting is not needed, otherwise, the processor 10 determines whether the boot image should be reloaded. If it is determined that the boot image should be reloaded, the processor 10 returns back to operation 203. Otherwise, if it is determined that the boot image does not need to be reloaded, the processor 10 returns back to operation 209 and ends booting of the image forming apparatus 2.

In operation 215, if it is determined in operation 211 that the booting mode of the image forming apparatus 2 is the normal booting mode, otherwise, the processor 10 initializes the OS in the image forming apparatus 2. Then, the processor 10 returns back to operation 209 and ends booting of the image forming apparatus 2.

Accordingly, referring to FIGS. 2A and 2B, if booting of the image forming apparatus 2 starts, a booting mode from among a fast booting mode (operations 207 and 208), the boot image generating mode (operation 212), and the normal booting mode (operation 215) is performed.

A process of generating a boot image according to the boot image generating mode and a process of performing fast booting will now be described in detail.

Figure 3:
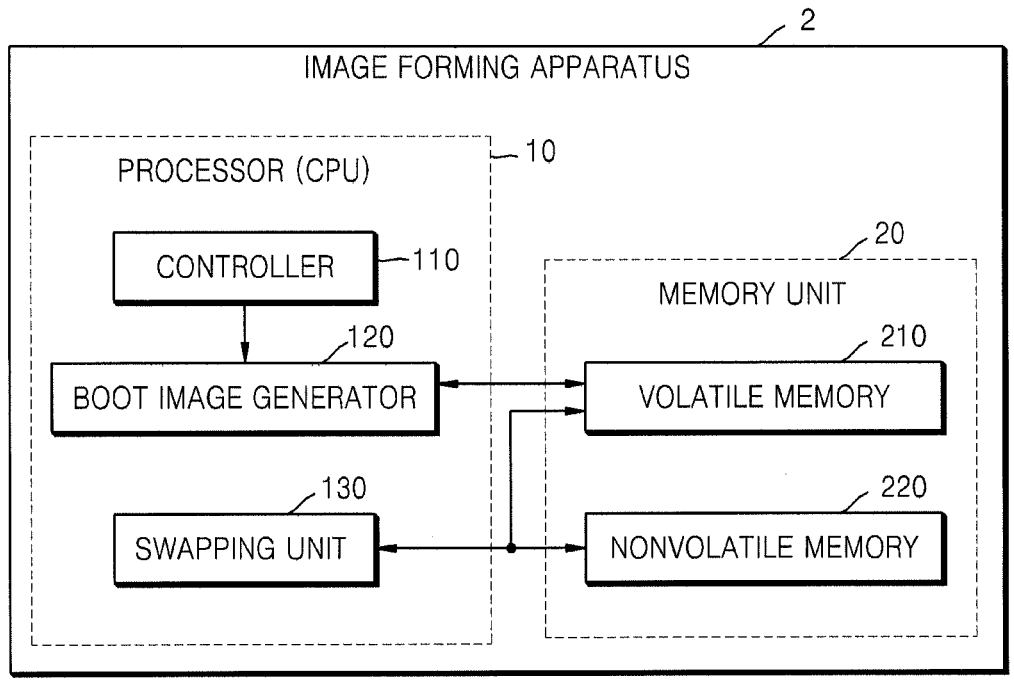
FIG. 3 is a block diagram of an image forming apparatus including a processor for generating a boot image, according to an embodiment.

FIG. 3 is a block diagram of an image forming apparatus 2 including a processor 10 for generating a boot image, according to an embodiment. Referring to FIG. 3, the image forming apparatus 2 includes the processor 10 and a memory unit 20, as illustrated in FIG. 1B. For clarity, the other elements of the image forming apparatus 2 are not illustrated in FIG. 3. Also, it will be apparent to those of ordinary skill in the art that only some of the elements of the processor 10 illustrated in FIG. 1C, which are related to an embodiment, are illustrated in FIG. 3.

Referring to FIG. 3, the processor 10 includes a controller 110, a boot image generator 120, and a swapping unit 130. The memory unit 20 includes a volatile memory 210 and a nonvolatile memory 220, as illustrated in FIG. 1B.

Figure 4:
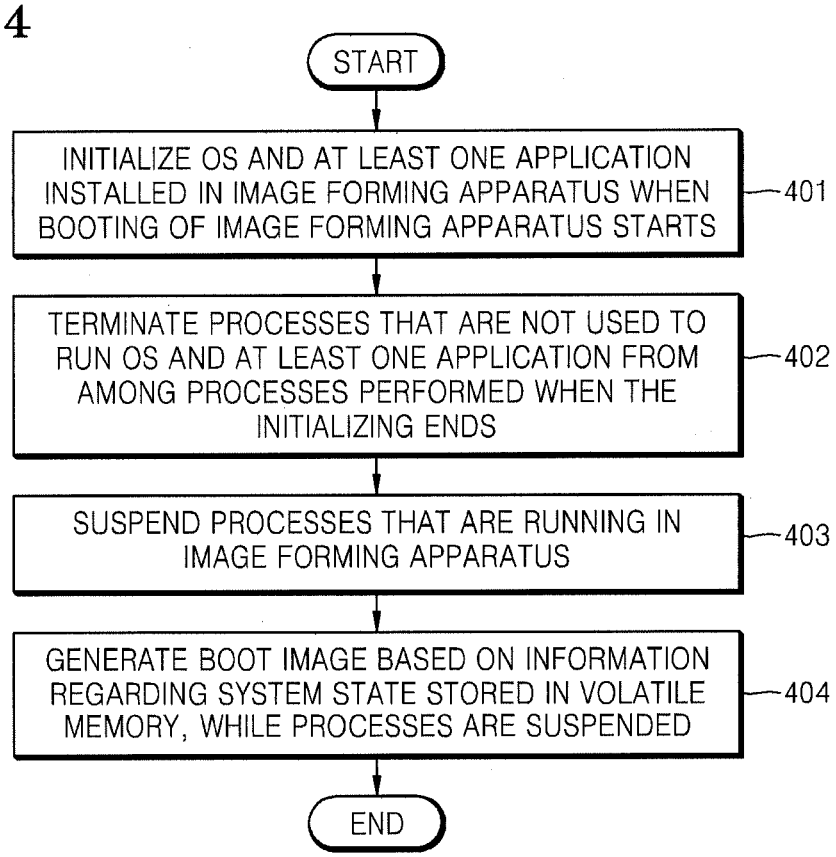
FIG. 4 is a flowchart illustrating a method of generating a boot image for fast booting an image forming apparatus, according to an embodiment.

FIG. 4 is a flowchart illustrating a method of generating a boot image for fast booting the image forming apparatus 2 of FIG. 3, according to an embodiment. Operations included in the method of FIG. 4 are performed sequentially by the image forming apparatus 2 of FIG. 3. Thus, the method of FIG. 4 will now be described with reference to FIGS. 3 and 4.

In operation 401, when booting of the image forming apparatus 2 starts, the controller 110 initializes an OS and at least one application installed in the image forming apparatus 2.

In operation 402, the controller 110 terminates a process that is not used to run the OS and the at least one application from among processes performed when the initializing ends.

In operation 403, the controller 110 suspends processes that are running in the image forming apparatus 2.

In operation 404, while the processes are suspended, the boot image generator 120 generates a boot image based on information regarding a system state, which is stored in the volatile memory 210. In an embodiment, the swapping unit 130 stores the boot image in the nonvolatile memory 220.

Figure 5:
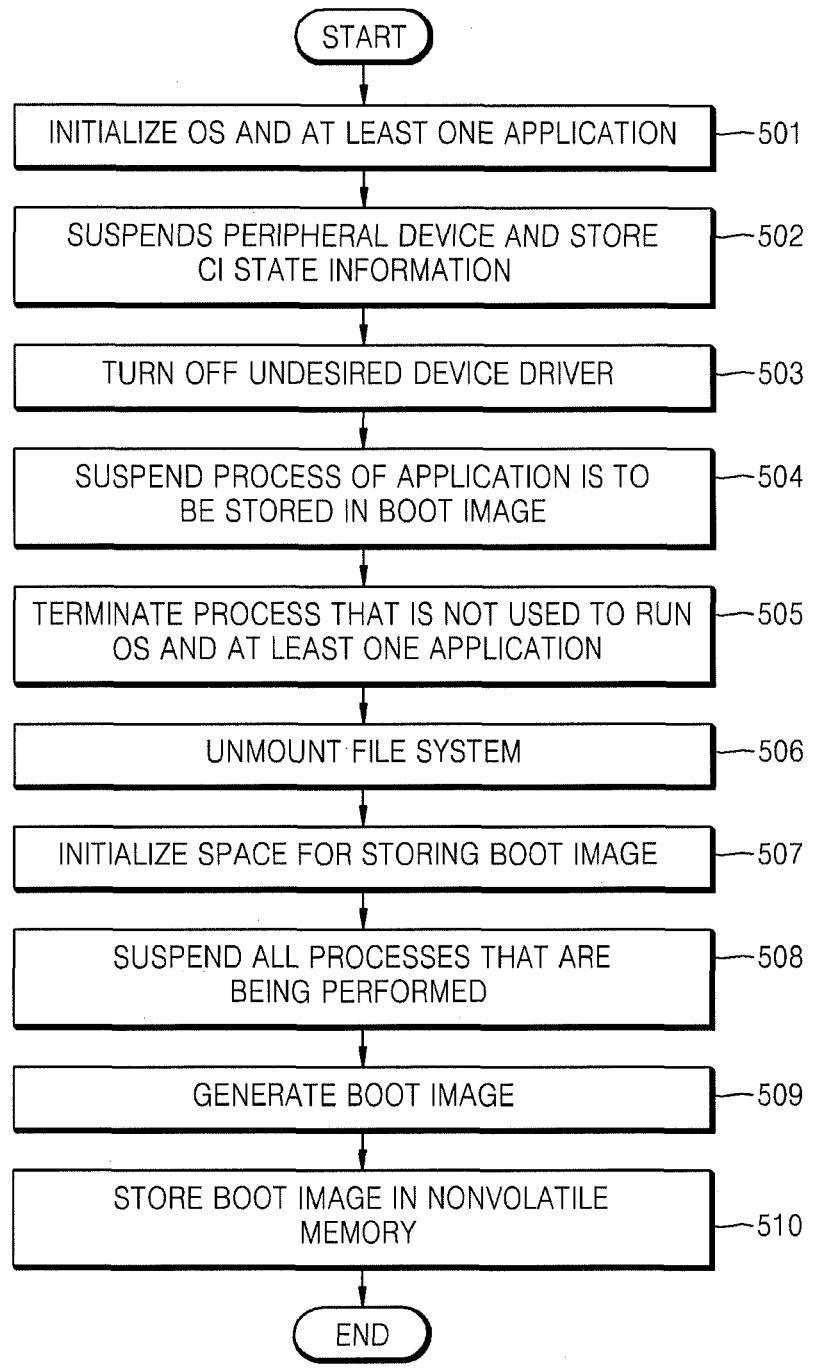
FIG. 5 is a detailed flowchart illustrating a method of generating a boot image for fast booting an image forming apparatus.

FIG. 5 is a detailed flowchart illustrating a method of generating a boot image for fast booting the image forming apparatus 2 of FIG. 3. FIG. 5 may be a flowchart specifically illustrating the method of FIG. 4.

In operation 501, when booting of the image forming apparatus 2 starts, the controller 110 initializes an OS and at least one application installed in the image forming apparatus 2. The at least one application may be an application for operating a system, unlike the OS. In an embodiment of the image forming apparatus 2, at least one application related to, for example, copying, printing, scanning, faxing, an address book, and a document box is initialized. During the initialization, data and threads of the at least one application are produced, and information needed is loaded to the volatile memory 210 from a file, a database, a network, or a network socket.

For example, when middleware, e.g., Java, is used, classes needed to operate the system are also initialized. However, in a Java system, the speed of an initial operation that is slow, major functions of the initial operation may be initialized and stored in a boot image so that the speed of booting Java may be increased after fast booting is performed. This is because interpreting and compiling are performed together when first code is executed since Java is interpreting-based middleware. Thus, the other codes may be executed at high speeds since compiling has been completed.

The controller 110 may determine whether the initialization performed in operation 501 is completed by respectively receiving, for example, messages as to whether the initialization has been completed from the OS and the at least one application.

In operation 502, the controller 110 suspends all peripheral devices, e.g., a USB device, a Bluetooth device, and the like. The reason why the peripheral devices are suspended is to prevent additional initialization from occurring when fast booting is performed using a boot image. Here, examples of the peripheral devices may include a network device, e.g., Ethernet, and a USB device. For example, in an embodiment of the image forming apparatus 2, a fax machine, a scanner, and a printer may be suspended. Also, the controller 110 stores peripheral component interconnect (PCI) state information of the image forming apparatus 2.

In operation 503, the controller 110 turns off an undesired device driver, caused by suspending the peripheral devices, from among drivers that are operating.

In operation 504, the controller 110 suspends a process of an application that is to be stored in a boot image from among the initialized at least one application, thereby preventing the image forming apparatus 2 from malfunctioning when the process according to the application is performed during generation of the boot image.

In operation 505, the controller 110 terminates a process that is not used to run the OS and the at least one application from among processes performed when the initialization of the OS and the at least one application is completed. For example, when the Linux OS is employed, the controller 110 terminates a process, such as 'samba', 'ssh', and 'telnet'. One of the reasons why such a process is terminated is to reduce the size of the boot image to be generated. If the process is performed using files, then information regarding a file that is open may be directly stored into the boot image. Thus, such a process is terminated to prevent the process from being performed based on such wrong file information when fast booting is performed using the boot image. In an embodiment of the image forming apparatus 2, a process of updating firmware (F/W) or a process or storing development log data may be terminated.

Also, the controller 110 may terminate other processes that are not used in a job of generating the boot image. Furthermore, the controller 110 may terminate a process that is performed for a time period that is less than a predetermined threshold value from among processes performed when the initialization of the OS and the at least one application has been completed. The predetermined threshold value may be changed according to a user's setting.

In operation 506, the controller 110 unmounts at least one from among a file system employed in the terminated process and a file system that is not used in the job of generating the boot image. In other words, the controller 110 unmounts all file systems that are not employed in processes that are currently operating. In an embodiment of the image forming apparatus 2, if user information, account information, history information, and the like are being used, then file systems related to all of these pieces of information are unmounted to safely retain file systems when the boot image is stored.

In operation 507, the controller 110 initializes a space in the nonvolatile memory 220, in which the boot image is to be stored. For example, the controller 110 may initialize a particular partition in the nonvolatile memory 220 so that the boot image may be stored in the particular partition. More specifically, the particular partition refers to a memory space in the nonvolatile memory 220, which has already been used but is not free and has been retained. In particular, when middleware, e.g., Java, is used, unnecessary data stored in the nonvolatile memory 220 may be removed using garbage collection. When the controller 110 initializes a space for storing the boot image, as described above, more memory spaces may be secured when fast booting is performed. In an embodiment, a spacious memory space may be secured without having to additionally perform garbage collection, thereby preventing the system from degrading.

The controller 110 initializes the nonvolatile memory 220 to be divided into several partitions. The reason why the nonvolatile memory 220 is divided into several partitions is to prevent all information regarding a file system from being stored in the boot image during generation of the boot image, when only one partition is present. If all of the information regarding the file system is stored in the boot image, then file information contained in the boot image may not be the same as file information regarding the file system. Thus, the controller 110 stores non-changeable data and changeable data in different partitions. In an embodiment of the image forming apparatus 2, non-changeable data may be data regarding a general OS and F/W data, and changeable data may be job history information, account information, a user address book, and data regarding an OS that may be changed by a user, e.g., an internet protocol (IP) address.

In operation 508, the controller 110 suspends all processes that are being performed in the image forming apparatus 2.

In operation 509, the boot image generator 120 generates the boot image based on information regarding a system state, stored in the volatile memory 210, while the processes that are being performed are suspended. More specifically, if all of the processes that are being performed are suspended in operation 508, then the controller 110 stores header information in the space in the nonvolatile memory 220, in which the boot image is to be stored, in order to prepare for generation of the boot image. After the preparation for generation of the boot image is completed, the boot image generator 120 generates the boot image, based on all data stored in the volatile memory 210 storing the information regarding the system state, CPU (processor 10) register data, and CPU cache information.

In other words, the information regarding the system state, which is contained in the boot image, includes the data in the volatile memory 210 and the CPU (processor 10) register data for booting the image forming apparatus 2 while the processes that are being performed are suspended.

In operation 510, the swapping unit 130 stores the generated boot image in the nonvolatile memory 220. The swapping unit 130 may store the boot image in a particular file or a particular partition in the nonvolatile memory 220.

Figure 6:
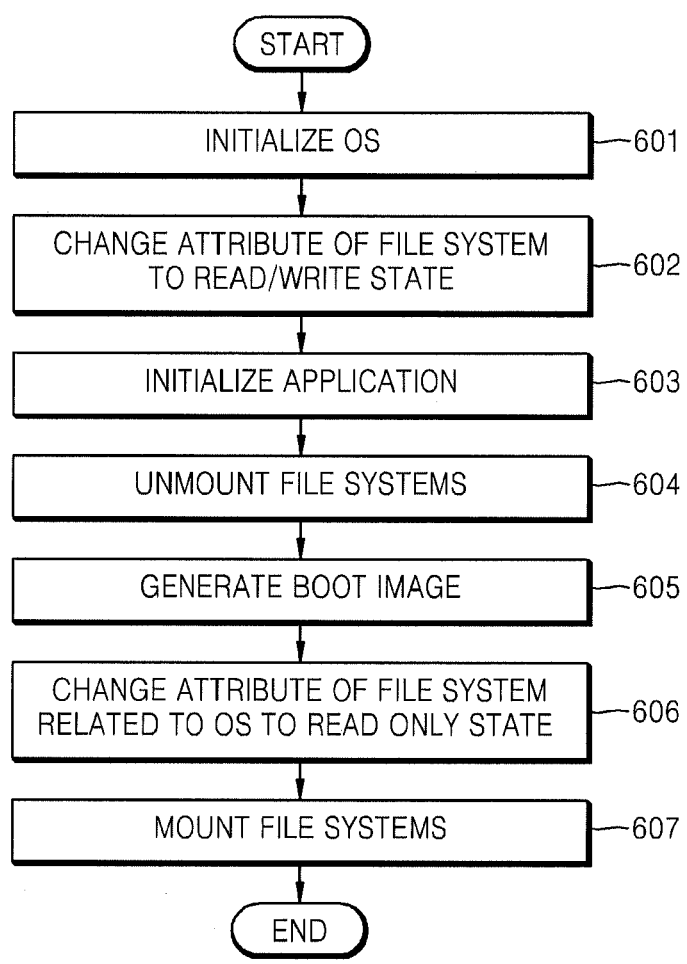
FIG. 6 is a detailed flowchart illustrating a process of changing attributes of a file system, according to an embodiment.

FIG. 6 is a detailed flowchart illustrating a process of changing attributes of a file system, according to an embodiment. The process of FIG. 6 also includes the unmounting of at least one file system (operation 506), included in the method of FIG. 5.

In operation 601, when booting of the image forming apparatus 2 of FIG. 1B starts, the controller 110 initializes an OS installed in the image forming apparatus 2.

In operation 602, when the initialization of the OS is completed, the controller 110 changes an attribute of at least one file system to a read/write state.

For example, according to an embodiment, the controller 110 changes attributes of all file systems to the read/write state. Then, in operation 604, the controller 110 unmounts all file systems. The reason why all of the file systems are unmounted after the attributes of all file systems are changed to the read/write state is to prevent file system information included in a boot image, which is to be generated, from being different from information regarding file systems that are actually stored in the nonvolatile memory 220.

For this reason, no file system information may be stored in the boot image that is to be generated. Thus, when fast booting is performed using the boot image, file systems are remounted and information regarding the file systems is newly loaded into the OS.

According to an embodiment, an attribute of a file system, the information of which is stored in the boot image and the information of which is actually stored in the nonvolatile memory 220 cannot be different from each other, may not be changed to the read/write state or may not be unmounted.

In operation 603, the controller 110 initializes at least one application.

In operation 604, the controller 110 unmounts the at least one file system based on the current attribute of the at least one file system that has been changed to the read/write state. In an embodiment, the controller 110 first closes all files/sockets/databases that are opened by the OS and the at least one application before unmounting the file systems. The reason why all of the files/sockets/databases are closed is to prevent the file systems from being normally unmounted, due to the open file/socket/database and to protect the file systems (see FIG. 7 for details). When the at least one file system is unmounted, all information regarding the at least one file system opened by the OS and the at least one application is erased. Thus, the at least one file system is stored in the boot image while the at least one file system is considered as not being present.

In operation 605, the boot image generator 120 generates the boot image.

In operation 606, if the boot image is generated, then the controller 110 changes the attribute of a file system related to the OS to a read only state from among the at least one file system, the attribute of which has been changed to the read/write state.

In operation 607, the controller 110 mounts file systems used in the OS, the at least one application, and other processes.

As described above, there is an embodiment where information regarding file systems included in the boot image is different from information regarding file systems that are actually stored in the nonvolatile memory 220. This will be described now in detail with reference to FIG. 7.

Figure 7:
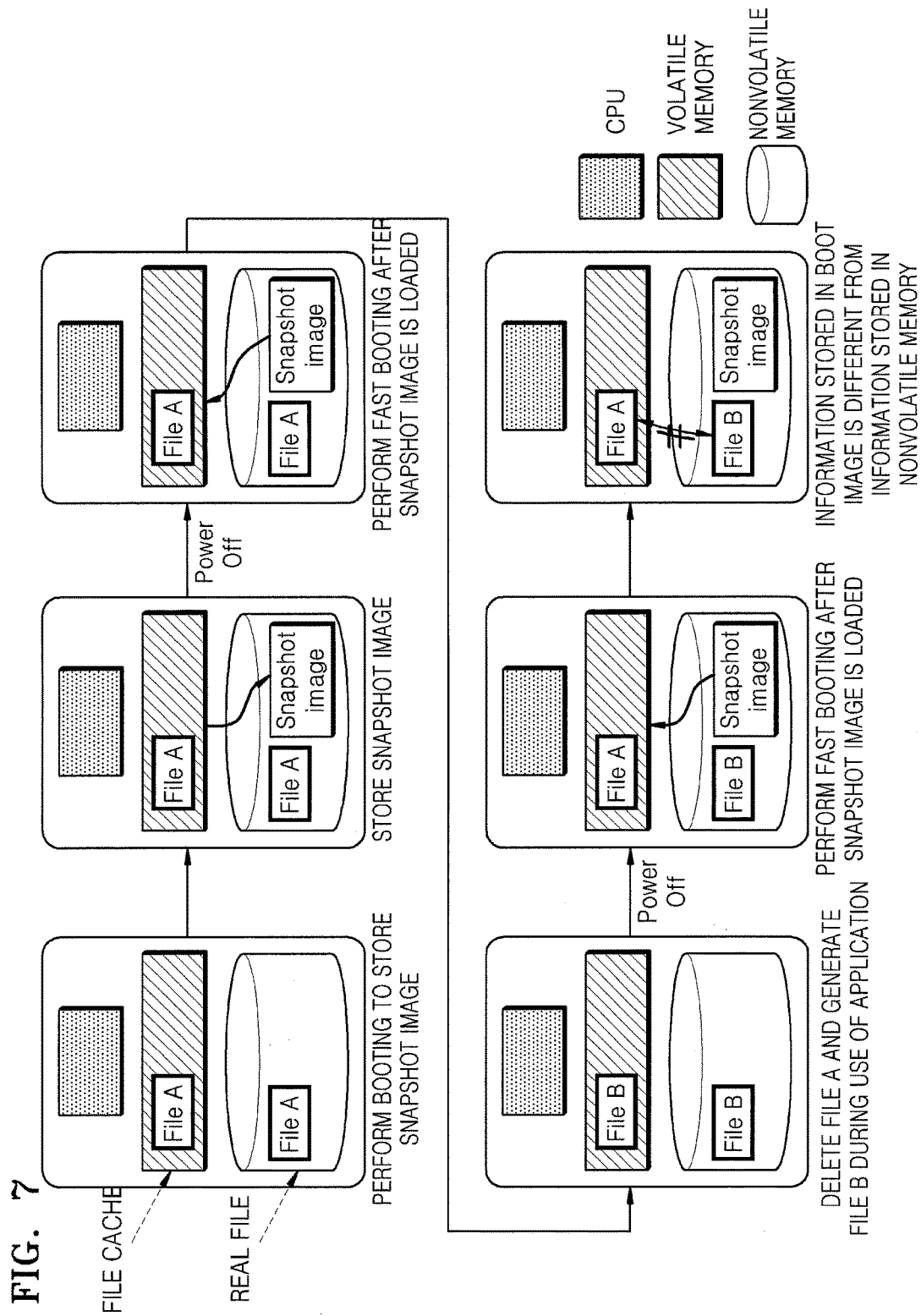
FIG. 7 is a diagram illustrating an embodiment where information regarding file systems included in a boot image different from information regarding file systems that are actually stored in a nonvolatile memory of FIG. 1A or 1B according to an embodiment.

FIG. 7 is a diagram illustrating an embodiment where information regarding file systems included in a boot image according to an embodiment is different from information regarding file systems that are actually stored in the nonvolatile memory 220 of FIG. 1A or 1B. Referring to FIG. 7, since a file A has been stored in the volatile memory 210 when a boot image is generated, the file A is also stored in the boot image. Then, if a user deletes the file A and uses a file B during use of an application, the file B is stored in the nonvolatile memory 220 instead of the file A. If the user performs fast booting using the boot image at a later time, the application tries to read the file A from the nonvolatile memory 220 since the file A has been stored in the boot image. However, since the file B is stored in the nonvolatile memory 220 instead of the file A, the application cannot read the file A, thus causing the application to malfunction.

To prevent this problem, all file systems or at least one particular file system should be unmounted before the boot image is generated.

Figure 8:
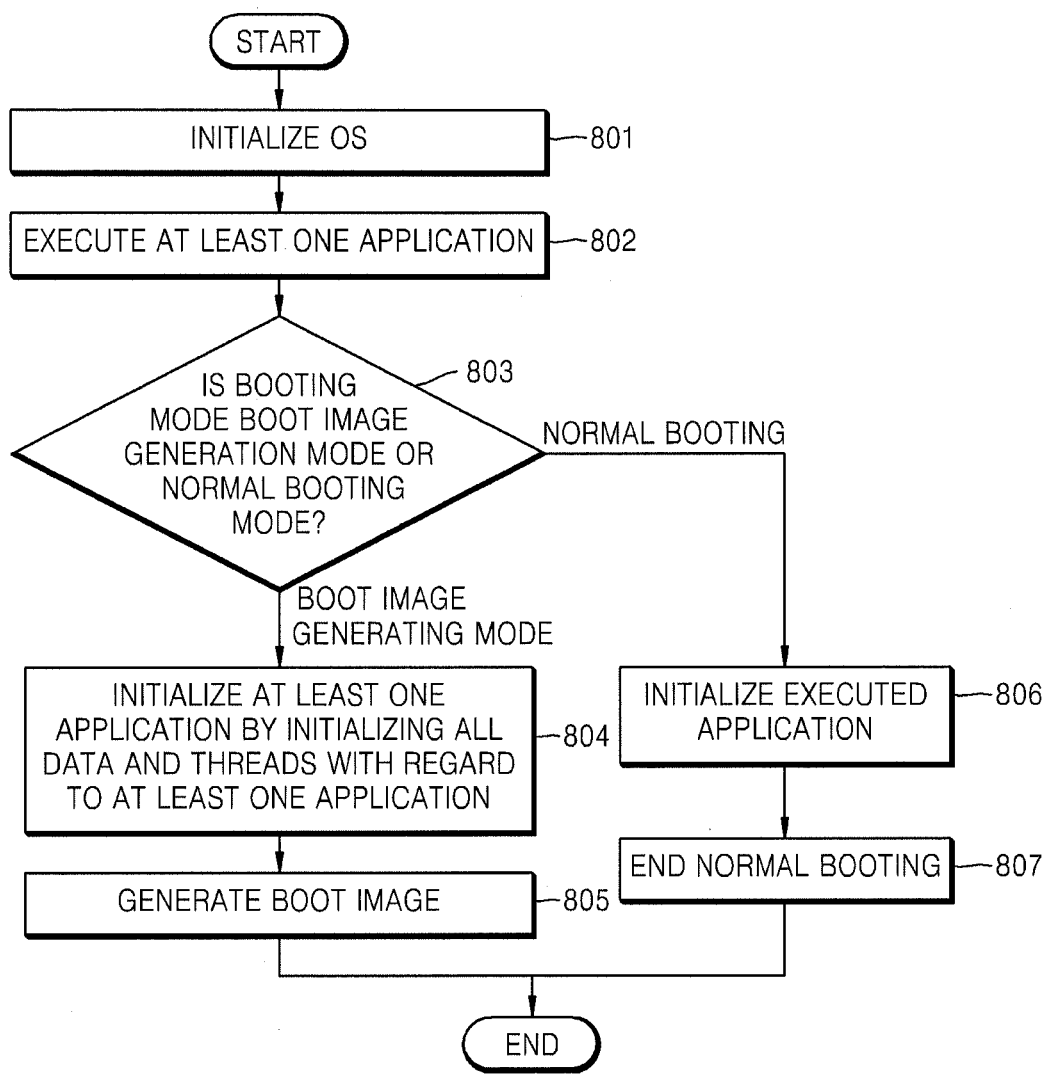
FIG. 8 is a detailed flowchart illustrating a process of initializing an application, according to an embodiment.

FIG. 8 is a detailed flowchart illustrating a process of initializing an application, according to an embodiment. FIG. 8 is a flowchart specifically illustrating operation 501 included in the method of FIG. 5, according to an embodiment.

Referring to FIG. 8, in operation 801, when booting of the image forming apparatus 2 starts, the controller 110 initializes an OS installed in the image forming apparatus 2.

Then, in operation 802, the controller 110 executes at least one application installed in the image forming apparatus 2.

In operation 803, the controller 110 determines whether a booting mode of the image forming apparatus 2 is the boot image generation mode or the normal booting mode. The process proceeds to operation 804 when the booting mode is the boot image generation mode, and proceeds to operation 806 when the booting mode is the normal booting mode.

In operation 804, when the booting mode is the boot image generation mode, the controller 110 initializes the at least one application by initializing all data and threads related to the at least one application. That is, the controller 110 initializes all of the data and threads related to the at least one application, in such a manner that all of the data and threads are initialized in the normal booting mode, e.g., a cold booting mode.

In operation 805, the boot image generator 120 generates a boot image by using the initialized application.

In operation 806, when the booting mode is the normal booting mode, the controller 110 initializes the executed application.

In operation 807, the controller 110 completes the normal booting of the image forming apparatus 2.

As described above, according to the process of FIG. 8, if the booting mode of the image forming apparatus 2 is the boot image generating mode, the controller 110 initializes all of the data and threads related to the at least one application before the boot image is generated.

However, when fast booting is performed using the boot image at a later time, variable information of the at least one application is re-initialized. Here, examples of the variable information may include data and threads that may be changed by a user during use of the at least one application. In an embodiment of the image forming apparatus 2, the variable information may include job history information, user account information, system options set by a user, and documents stored by the user. As described above, the variable information is information that may be changed by a user after the boot image is generated and should be re-initialized after fast booting is performed. In other words, after fast booting is performed, the variable information is read out again from the nonvolatile memory 220 to re-initialize information included in the boot image. If the variable information is not re-initialized, then the information included in the boot image may be directly used, thereby causing data conflict. However, since the variable information may be initialized two times, it may be a waste of time.

Figure 9:
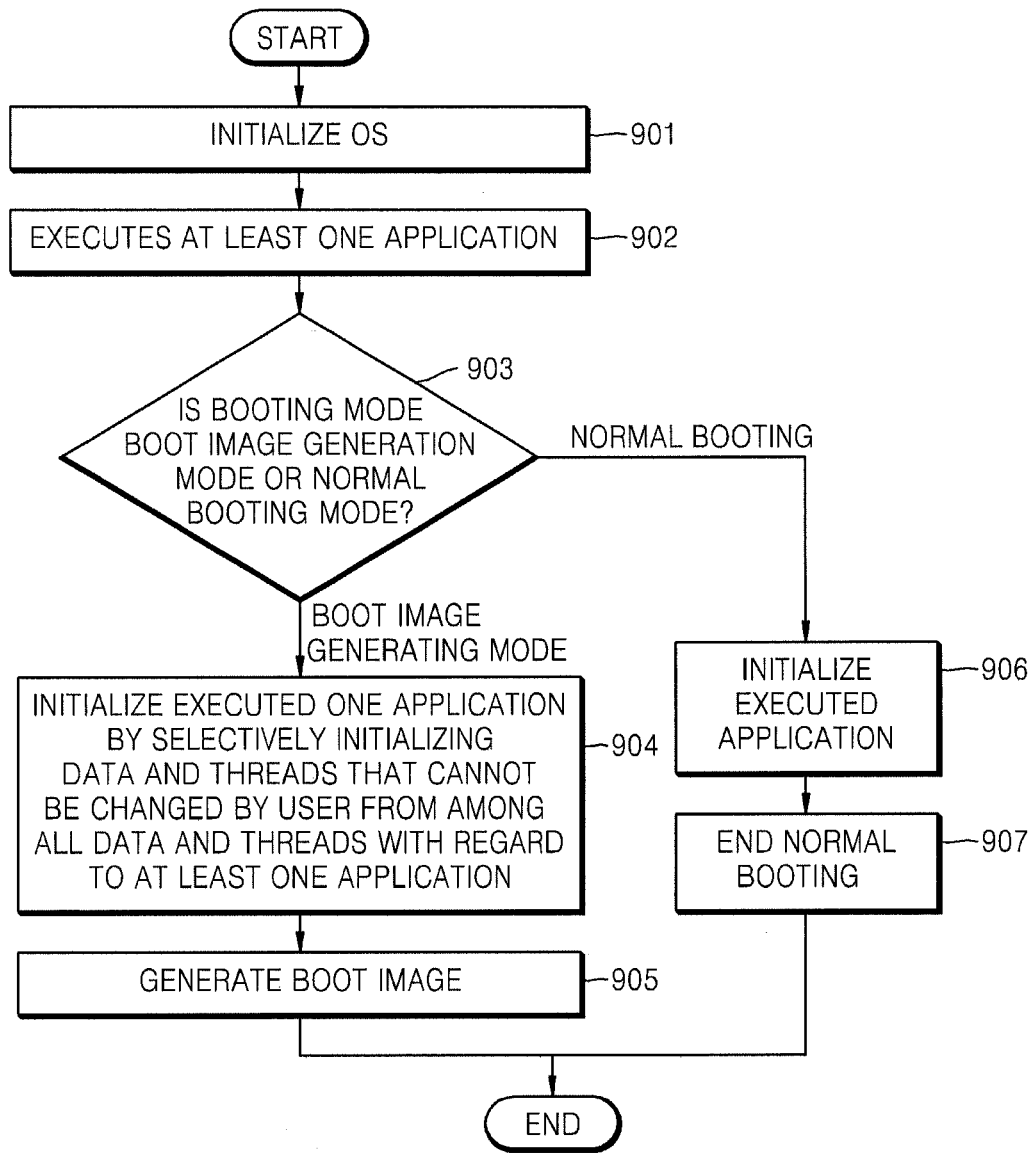
FIG. 9 is a detailed flowchart illustrating a process of initializing an application, according to an embodiment.

FIG. 9 is a detailed flowchart illustrating a process of initializing an application, according to an embodiment. FIG. 9 is a flowchart specifically illustrating operation 501 included in the method of FIG. 5, according to embodiment. Compared to the process of FIG. 8, all data and threads included in an application are not initialized.

Referring to FIG. 9, in operation 901, when booting of the image forming apparatus 2 starts, the controller 110 initializes an OS installed in the image forming apparatus 2.

Then, in operation 902, the controller 110 executes at least one application installed in the image forming apparatus 2.

In operation 903, the controller 110 determines whether a booting mode of the image forming apparatus 2 is the boot image generation mode or the normal booting mode. The process proceeds to operation 904 when the booting mode is the boot image generation mode, and proceeds to operation 906 when the booting mode is the normal booting mode.

In operation 904, when the booting mode is the boot image generation mode, the controller 110 initializes the executed application by selectively initializing data and threads that cannot be changed by a user from among all data and threads related to the at least one application.

In operation 905, the boot image generator 120 generates a boot image by using the initialized application.

In operation 906, when the booting mode is the normal booting mode, the controller 110 initializes the executed application.

In operation 907, the controller 110 completes the normal booting of the image forming apparatus 2.

As described above, according to the process of FIG. 9, if the booting mode of the image forming apparatus 2 is the boot image generating mode, then data and threads are selectively initialized from among all data and threads related to an application before a boot image is generated, thereby preventing already initialized variable information from being re-initialized. In other words, the variable information is not initialized when a boot image is generated but is initialized when fast booting is performed, thereby reducing a time needed to generate the boot image.

Referring back to FIG. 1B, the user interface unit 30 receives information from a user or provides the user with information processed by the image forming apparatus 2 via an information input device (not shown).

Figure 10:
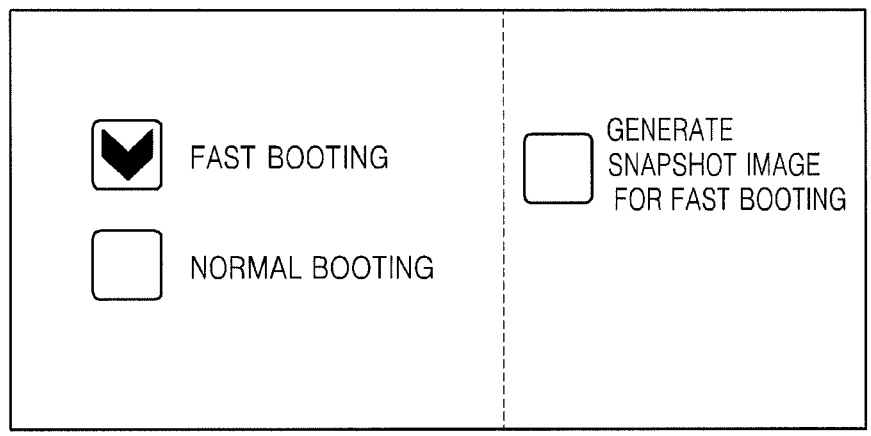
FIG. 10 illustrates an image that is displayed on a user interface unit and on which a desired booting mode is to be selected from among booting modes, according to an embodiment.

FIG. 10 illustrates an image that are displayed on the user interface unit 30 and on which a desired booting mode is to be selected from among booting modes. As described above, examples of a booting mode include the fast booting mode, the normal booting mode, and the boot image generating mode. A user may select a desired booting mode from an image, such as that shown in FIG. 10, on the user interface unit 30.

Figure 11:
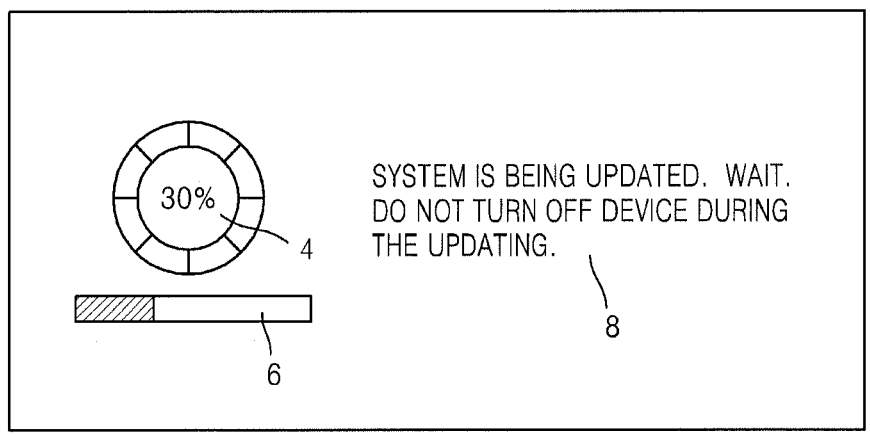
FIG. 11 illustrates an image displayed on a user interface unit when a boot image is generated based on a boot image generating mode, according to an embodiment.

FIG. 11 illustrates an image displayed on the user interface unit 30 when a boot image is generated based on a boot image generating mode, according to an embodiment. Referring to FIG. 11, a progress of the boot image that is being generated is illustrated. In particular, the progress may be expressed in various forms, e.g., by using numbers 4, e.g., a percentage, or a graph 6. Furthermore, a message 8 that is to be reported to a user may also be displayed.

However, the images illustrated in FIGS. 10 and 11 are illustrative but are not limited thereto.

Methods of generating a boot image by using the image forming apparatus 2 of FIG. 1B, according to embodiments, have been described above. Methods of performing fast booting of the image forming apparatus 2 by using a boot image generated by the image forming apparatus 2, according to embodiments, will now be described.

Figure 12:
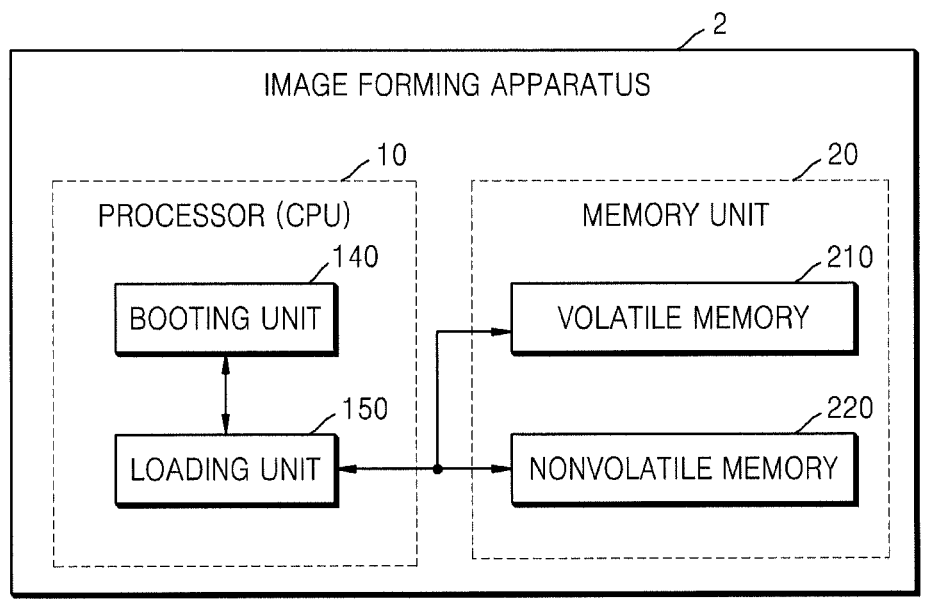
FIG. 12 is a block diagram of an image forming apparatus that includes a processor for performing fast booting by using a boot image, according to an embodiment.

FIG. 12 is a block diagram of an image forming apparatus 2 that includes a processor 10 for performing fast booting by using a boot image, according to an embodiment. Referring to FIG. 12, the image forming apparatus 2 includes the processor 10 and a memory unit 20, as illustrated in FIG. 1B. For convenience of explanation, the other elements of the image forming apparatus 2 are not illustrated in FIG. 12. However, FIG. 12 illustrates only some of the elements of the processor 10 illustrated in FIG. 1C, which are related to an embodiment.

The processor 10 includes a booting unit 140 and a loading unit 150. The memory unit 20 includes a volatile memory 210 and a nonvolatile memory 220, as described above with reference to FIG. 1B.

Figure 13:
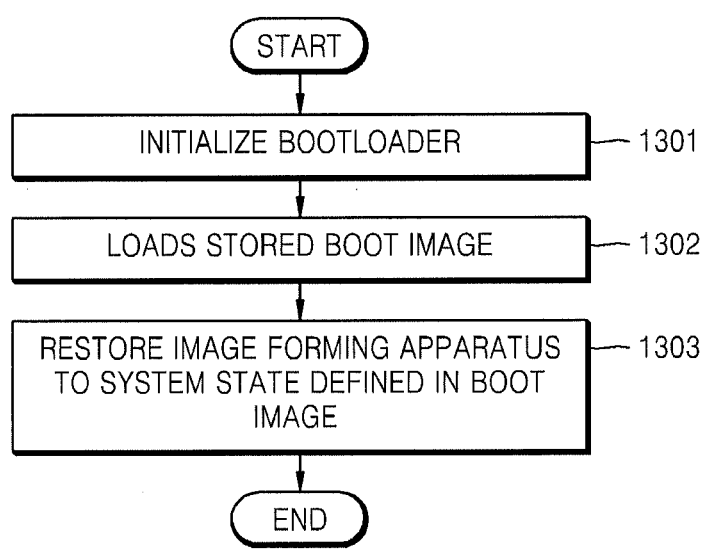
FIG. 13 is a flowchart illustrating a method of fast booting an image forming apparatus by using a boot image, according to an embodiment.

FIG. 13 is a flowchart illustrating a method of fast booting the image forming apparatus 2 of FIG. 12 by using a boot image, according to an embodiment. Operations included in the method of FIG. 13 are performed sequentially by the image forming apparatus 2 of FIG. 12. Thus, the method of FIG. 13 will now be described with reference to FIGS. 12 and 13.

In operation 1301, if the image forming apparatus 2 is powered on, the booting unit 140 starts booting of the image forming apparatus 2. In other words, the booting unit 140 initializes a bootloader.

In operation 1302, the loading unit 150 loads a boot image stored in the image forming apparatus 2. The boot image is as described above. More specifically, the boot image has been stored before operation 1301 is performed, i.e., before the booting of the image forming apparatus 2 starts, and contains information regarding a system state, after processes that are not used to run an OS and an at least one application installed in the image forming apparatus 2 are terminated from among processes performed when initialization of the OS and the at least one application terminates and while the processes that run in the image forming apparatus 2 are suspended.

In operation 1303, the booting unit 140 restores the image forming apparatus 2 to the system state defined in the boot image, based on the loaded boot image.

Figure 14:
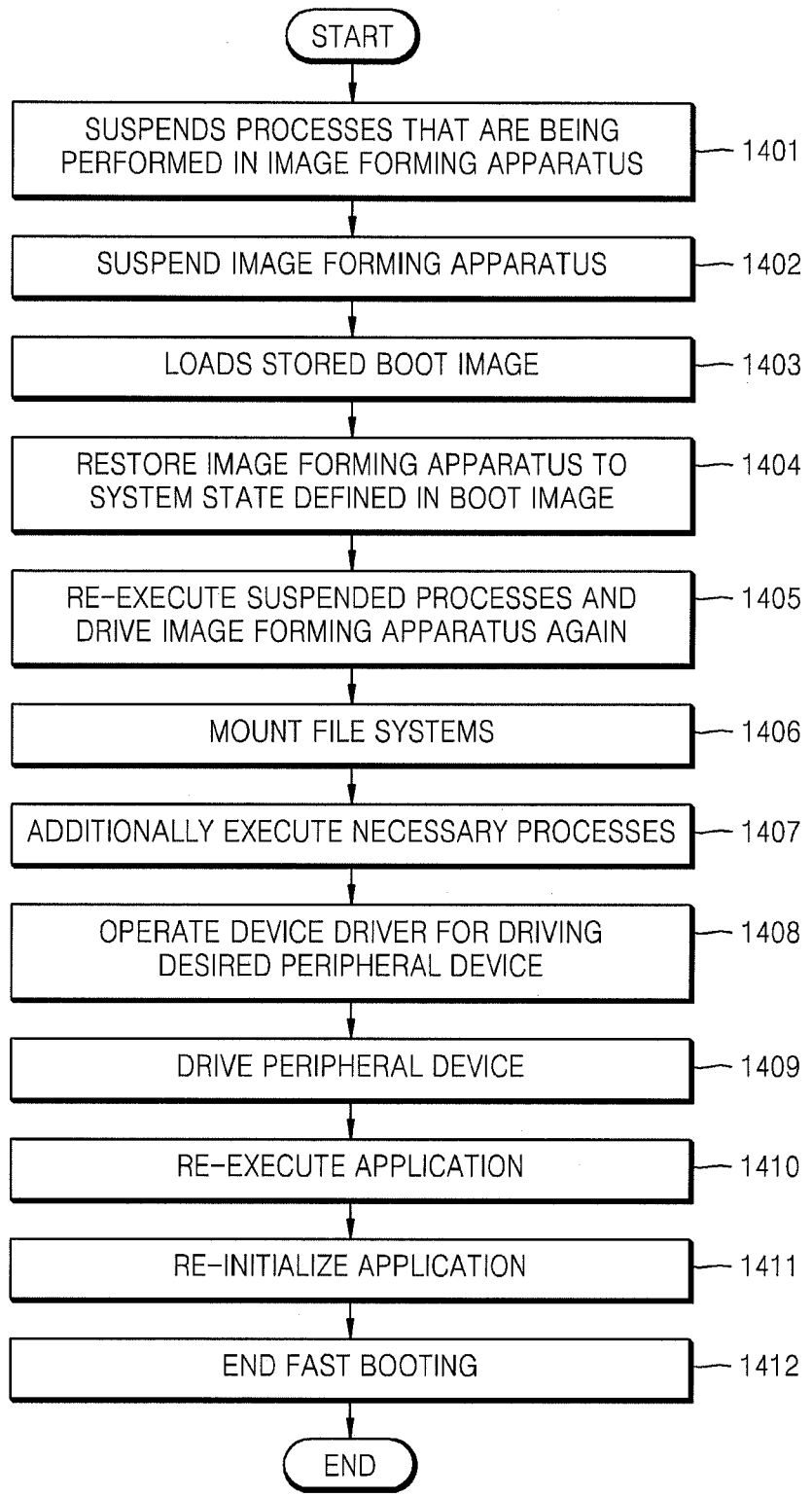
FIG. 14 is a detailed flowchart illustrating a method of fast booting an image forming apparatus by using a boot image from FIG. 13.

FIG. 14 is a detailed flowchart illustrating a method of fast booting the image forming apparatus 2 by using a boot image. FIG. 14 may be a flowchart specifically illustrating the method of FIG. 13.

In operation 1401, if a booting mode of the image forming apparatus 2 is the fast booting mode using a boot image, then the booting unit 140 suspends processes that are currently being performed in the image forming apparatus 2.

Then, in operation 1402, the booting unit 140 controls the image forming apparatus 2 to be suspended. When the image forming apparatus 2 is suspended, peripheral devices of the image forming apparatus 2, e.g., a network device and a USB device, are also suspended. Also, for example, a print unit and a fax unit included in the image forming apparatus 2 may be suspended.

The reason why the processes are suspended in operation 1401 and the image forming apparatus 2 is suspended in operation 1402 is to prepare for loading a boot image.

In operation 1403, the loading unit 150 loads a boot image stored in the nonvolatile memory 220 into the volatile memory 210.

In operation 1404, the booting unit 140 restores the image forming apparatus 2 to a system state defined in the boot image, based on the loaded boot image.

In operation 1405, the booting unit 140 re-executes the suspended processes and drives the image forming apparatus 2 again.

In operation 1406, the booting unit 140 mounts file systems used in an OS, at least one application, and the executed processes. Examples of the file systems mounted in the image forming apparatus 2 may include a user document, a user address book, temporary print data, scan image data, and the like, but is not limited thereto and file systems regarding other uses may be mounted.

In operation 1407, the booting unit 140 additionally executes necessary processes. For example, when a Linux OS is used, the booting unit 140 may additionally execute processes, such as 'samba' or 'ssh'. Also, a process of an application of updating F/W in the image forming apparatus 2, a process of a program of storing, for example, user log and development log, and a process of a program installed by a user may be additionally executed. If there is no application to be additionally executed, operation 1407 may be skipped.

In operation 1408, the booting unit 140 operates a device driver for driving a peripheral device that the image forming apparatus 2 uses. For example, the booting unit 140 may operate a USB driver for driving a USB device or may operate a drive for communicating with, for example, the print unit, the fax unit, and a scanning unit included in the image forming apparatus 2.

In operation 1409, the booting unit 140 drives the peripheral device by using the device driver operated in operation 1408. As described above, the booting unit 140 may communicate with a peripheral device to determine whether the peripheral device has been initialized and can operate, and then operate the peripheral device. For example, the booting unit 140 may drive the print unit, the fax unit, or the scanning unit in the image forming apparatus 2.

In operation 1410, the booting unit 140 re-executes an application that has been initialized and stored in the boot image.

In operation 1411, the booting unit 140 re-initializes the application. In an embodiment, the booting unit 140 may initialize variable information of the application, e.g., data and threads related to the application, which may be changed by a user. More specifically, the variable information that needs to be re-initialized when fast booting is performed refers to data that may be changed by a user or a system, e.g., history information, count information, and option information. In an embodiment of the image forming apparatus 2, the variable information may include job history information, user history information, toner/tray information, network setting information, and the like. Also, the variable information may include option information of an application changed by a user, and option information related to a copying operation set by the user.

In operation 1412, the booting unit 140 completes fast booting of the image forming apparatus 2.

Methods of fast booting the image forming apparatus 2 by using a boot image, according to embodiments, have been described above. When fast booting is performed using a boot image, the system state stored in the boot image is first booted unlike in the normal booting mode, thereby increasing the speed of booting the image forming apparatus 2. In particular, it takes a lot time to boot a system employing middleware that is slowly booted. For example, a system employing middleware, e.g., Java, is more slowly booted than a C-language based system. Furthermore, when Java uses a framework, e.g., a spring framework, it is possible to provide convenience and expandability in developing programs but a system booting speed may be very slow. If a system is booted using a boot image according to an embodiment, the booting speed or time may be increased as shown in Table 1 below.

Table 1 compares times needed to activate functions of an MFP device with ARM CPU 800 MHz and 512 MB RAM when the normal booting mode is used with those when the fast booting mode is used, but is not limited thereto.

TABLE 1

| Booting Type | A point of time that a copy screen is displayed | A point of time that printing is possible | A point of time that full booting is completed |
|---|---|---|---|
| Normal booting (cold booting) | 03:40 (min) | 05:30 (min) | 01:20 (min) |
| Fast booting using boot image | 01:10 (min) | 01:10 (min) | 02:00 (min) |

Referring back to FIG. 1B, various types of software have been installed in the image forming apparatus 2. For example, F/W, an OS, and at least one application are installed in the image forming apparatus 2. Such software is stored in the nonvolatile memory 220.

There is an embodiment where a user desires to change software during use of the image forming apparatus 2. For example, a request for a software change may be at least one from among a request for updating F/W, a request for installing an application, a request for updating an application, and a request for deleting an application.

When software change is performed in response to the request for a software change, a boot image may have to be updated. For example, there is an embodiment where setting values used to run an application cannot be changed once a boot image is generated. Also, there is an embodiment a collision occurs during running of software since information regarding changed software is different from information regarding software stored in a boot image. In an embodiment, the boot image should be updated.

First, a process of updating a boot image when a request for updating F/W is received from a user will now be described.

Figure 15:
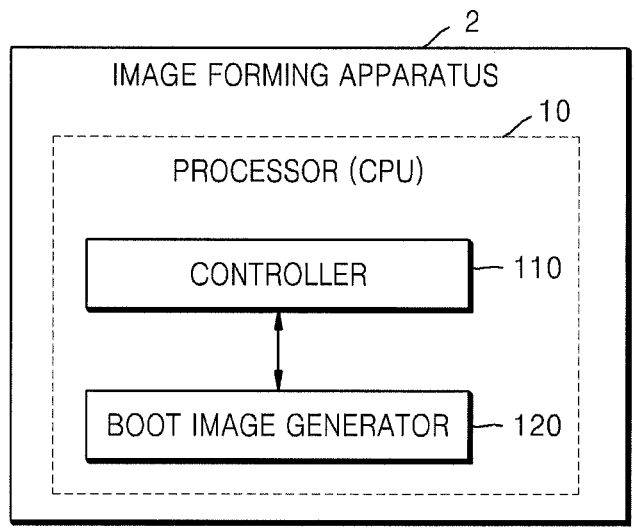
FIG. 15 is a block diagram of an image forming apparatus that includes a processor for updating a boot image, according to an embodiment.

FIG. 15 is a block diagram of an image forming apparatus 2 that includes a processor 10 for updating a boot image, according to an embodiment. Referring to FIG. 15, the image forming apparatus 2 includes the processor 10 as illustrated in FIG. 1B. For convenience of explanation, the other elements of the image forming apparatus 2 are not illustrated in FIG. 15. However, FIG. 15 illustrates only some of the elements of the processor 10 illustrated in FIG. 1C, which are related to an embodiment.

The processor 10 includes a controller 110 and a boot image generator 120.

Figure 16:
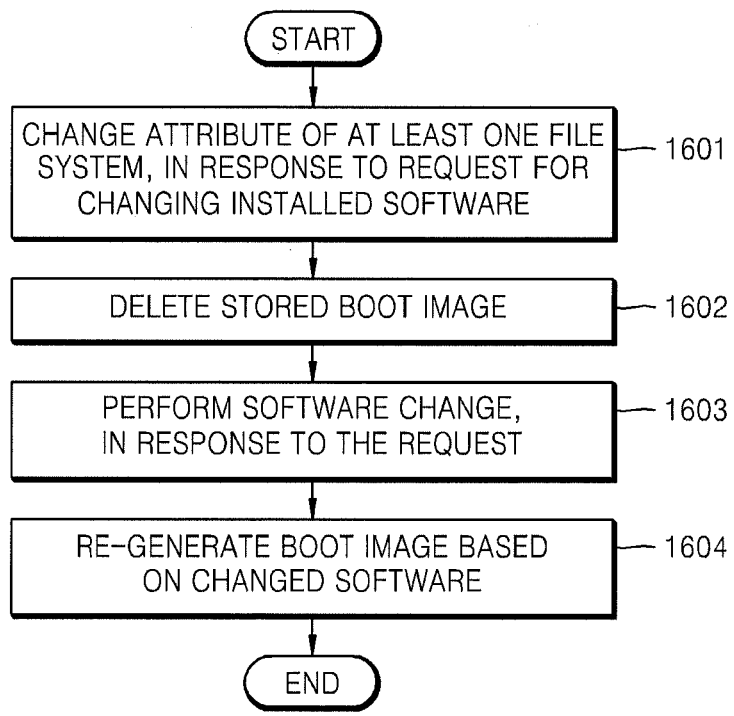
FIG. 16 is a flowchart illustrating a method of updating a boot image, according to an embodiment.

FIG. 16 is a flowchart illustrating a method of updating a boot image, according to an embodiment. Operations included in the method of FIG. 16 are performed sequentially by the image forming apparatus 2 of FIG. 15. Thus, the method of FIG. 16 will now be described with reference to FIGS. 15 and 16.

In operation 1601, when a request for changing software installed in the image forming apparatus 2 is received, the controller 110 changes an attribute of at least one file system stored in the image forming apparatus 2.

In operation 1602, the controller 110 deletes a boot image stored in the image forming apparatus 2.

In operation 1603, the controller 110 performs a software change in response to the request.

In operation 1604, the boot image generator 120 re-generates a boot image based on the changed software.

Figure 17A:
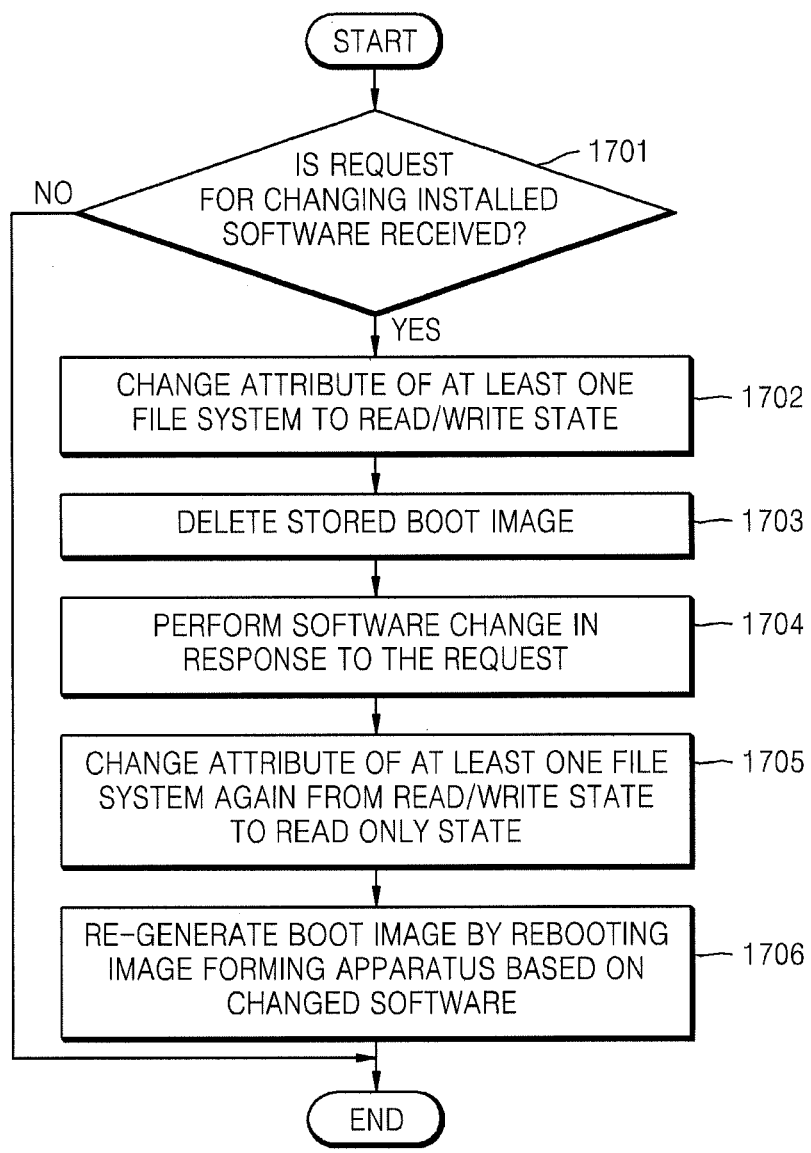
FIG. 17A is a detailed flowchart illustrating a method of updating a boot image of FIG. 16, according to an embodiment.

FIG. 17A is a detailed flowchart illustrating a method of updating a boot image. FIG. 17A may be a flowchart specifically illustrating the method of FIG. 16, according to an embodiment. FIG. 17A may be a flowchart illustrating a method of updating a boot image when F/W needs to be updated and a new boot image is not included in the F/W. Also, FIG. 17A may be a flowchart illustrating a method of updating a boot image when an application is installed, updated, or deleted.

Referring to FIGS. 15 and 17A, in operation 1701, the controller 110 determines whether a request for changing software installed in the image forming apparatus 2 is received. If it is determined that the request is not received, the controller 110 does not update a boot image and the method of FIG. 17A ends.

In operation 1702, if it is determined that the request is received, otherwise, the controller 110 changes an attribute of at least one file system stored in the image forming apparatus 2. In an embodiment, the controller 110 may change the attribute of the at least one file system from a read only state to a read/write state.

In operation 1703, the controller 110 deletes the boot image stored in the nonvolatile memory 220 of the image forming apparatus 2.

In operation 1704, the controller 110 performs a software change in response to the request. In other words, the controller 110 updates F/W, or installs, updates, or deletes an application.

In operation 1705, when the software change is completed, the controller 110 changes the attribute of the at least one file system again from the read/write state to the read only state.

In operation 1706, the boot image generator 120 re-generates a boot image by rebooting the image forming apparatus 2 based on the changed software. In an embodiment, the process of generating a boot image after booting of the image forming apparatus 2 starts described above may be used. Thus, a detailed description thereof is not provided here again.

Figure 17B:
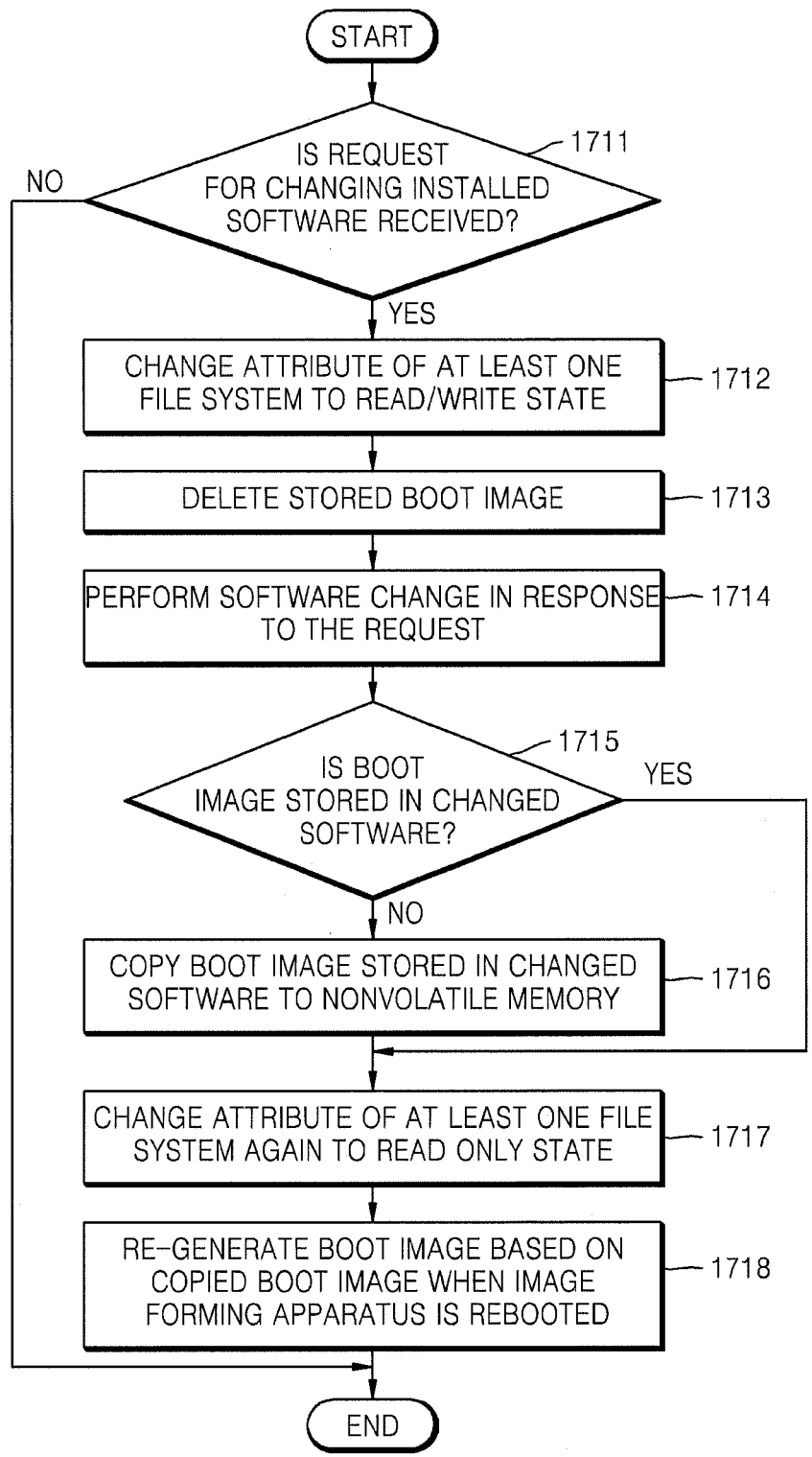
FIG. 17B is a detailed flowchart illustrating a method of updating a boot image of FIG. 16, according to an embodiment.

FIG. 17B is a detailed flowchart illustrating a method of updating a boot image, according to an embodiment. FIG. 17B may be a flowchart specifically illustrating the method of FIG. 16, according to an embodiment. FIG. 17B may be a flowchart illustrating a method of updating a boot image when FAN needs to be updated and a new boot image is included in the F/W, unlike in FIG. 17A.

In operation 1711, the controller 110 determines whether a request for changing software installed in the image forming apparatus 2 is received. If it is determined that the request is not received, the controller 110 does not update a boot image.

In operation 1712, if it is determined that the request is received, otherwise, the controller 110 changes an attribute of at least one file system stored in the image forming apparatus 2. In an embodiment, the controller 110 may change the attribute of the at least one file system from a read only state to a read/write state.

In operation 1713, the controller 110 deletes the boot image stored in the nonvolatile memory 220 of the image forming apparatus 2.

In operation 1714, the controller 110 performs a software change in response to the request. For example, the controller 110 may update F/W.

In operation 1715, if software, such as F/W, is changed, the controller 110 determines whether a boot image is stored in the changed software. In an embodiment, various types of boot images may be stored in the F/W. For example, boot images may be stored in the form of a file. Otherwise, a portion of a boot image that is identical with a portion of the boot image stored in the image forming apparatus 2 may be provided, and the remaining portion of the boot image may be provided at a later time to be initialized when fast booting is performed.

If it is determined that a boot image is not stored in the changed software, the method proceeds to operation 1717.

In operation 1716, if it is determined that a boot image is stored in the changed software, otherwise, the controller 110 copies the boot image stored in the changed software to the nonvolatile memory 220.

In operation 1717, when the software change is completed, the controller 110 changes the attribute of the at least one file system again from the read/write state to the read only state.

In operation 1718, the boot image generator 120 re-generates a boot image based on the copied boot image, when the image forming apparatus 2 is rebooted. The re-generating of the boot image, performed in operation 1718, indicates that the copied boot image is stored as a new boot image in the image forming apparatus 2.

Then, referring back to FIGS. 2A and 2B, the processor 10 determines whether the boot image has an error (operation 206), and restores the stored boot image when it is determined that the boot image has an error (operation 210). Operations 206 and 210 will be described in detail below.

Figure 18:
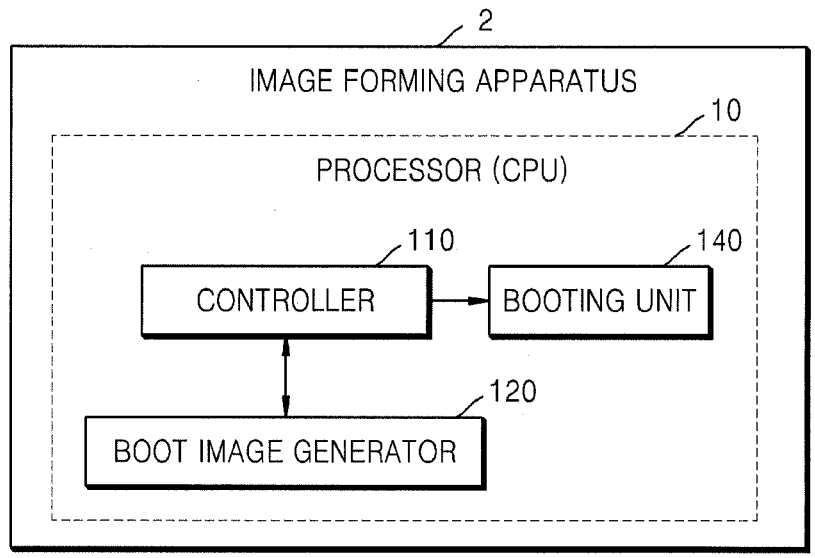
FIG. 18 is a schematic block diagram of an image forming apparatus that includes a processor for fixing an error in a boot image, according to an embodiment.

FIG. 18 is a schematic block diagram of an image forming apparatus 2 that includes a processor 10 for fixing an error in a boot image, according to an embodiment. Referring to FIG. 18, the image forming apparatus 2 includes the processor 10, as illustrated in FIG. 1B. For convenience of explanation, the other elements of the image forming apparatus 2 are not illustrated in FIG. 18. However, FIG. 18 illustrates only some of the elements of the processor 10 illustrated in FIG. 1C, which are related to an embodiment.

The processor 10 includes a controller 110, a boot image generator 120, and a booting unit 140.

Figure 19:
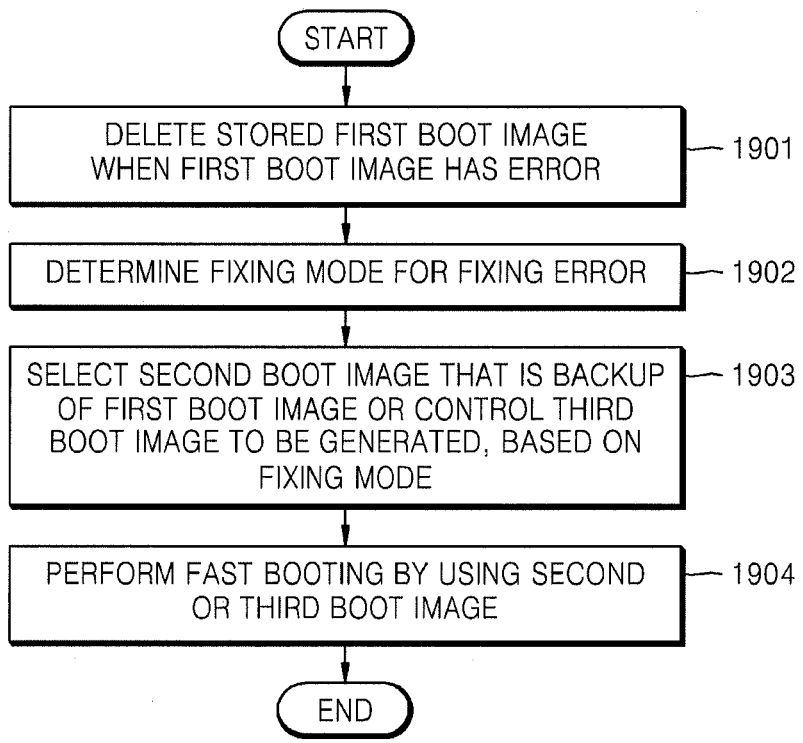
FIG. 19 is a flowchart illustrating a method of fixing an error in a boot image to fast boot an image forming apparatus, according to an embodiment.

FIG. 19 is a flowchart illustrating a method of fixing an error in a boot image to fast boot the image forming apparatus 2 of FIG. 18, according to an embodiment. Operations included in the method of FIG. 19 are performed sequentially by the image forming apparatus 2 of FIG. 18. Thus, the method of FIG. 19 will now be described with reference to FIGS. 18 and 19.

In operation 1901, if booting of the image forming apparatus 2 starts, the controller 110 deletes a first boot image stored in the image forming apparatus 2 when the first boot image has an error. Here, the first boot image refers to a boot image that was generated and stored in the image forming apparatus 2 before the image forming apparatus 2 is booted.

In operation 1902, the controller 110 determines a fixing mode for fixing the error in the first image. Here, the fixing mode may include at least one from among the boot image generating mode, a backup boot image replacing mode, and a norm booting switching mode.

In operation 1903, the controller 110 selects a second boot image that is a backup of the first boot image or controls the boot image generator 120 to generate a third boot image, based on the determined fixing mode.

In operation 1904, the booting unit 120 performs fast booting by using the second or third boot image.

The first to third boot images have been described above with reference to FIGS. 2A to 5, and include data stored in a volatile memory 210, which is needed for a system state when initial booting of an image forming apparatus 2 is performed, and CPU register data.

Figure 20:
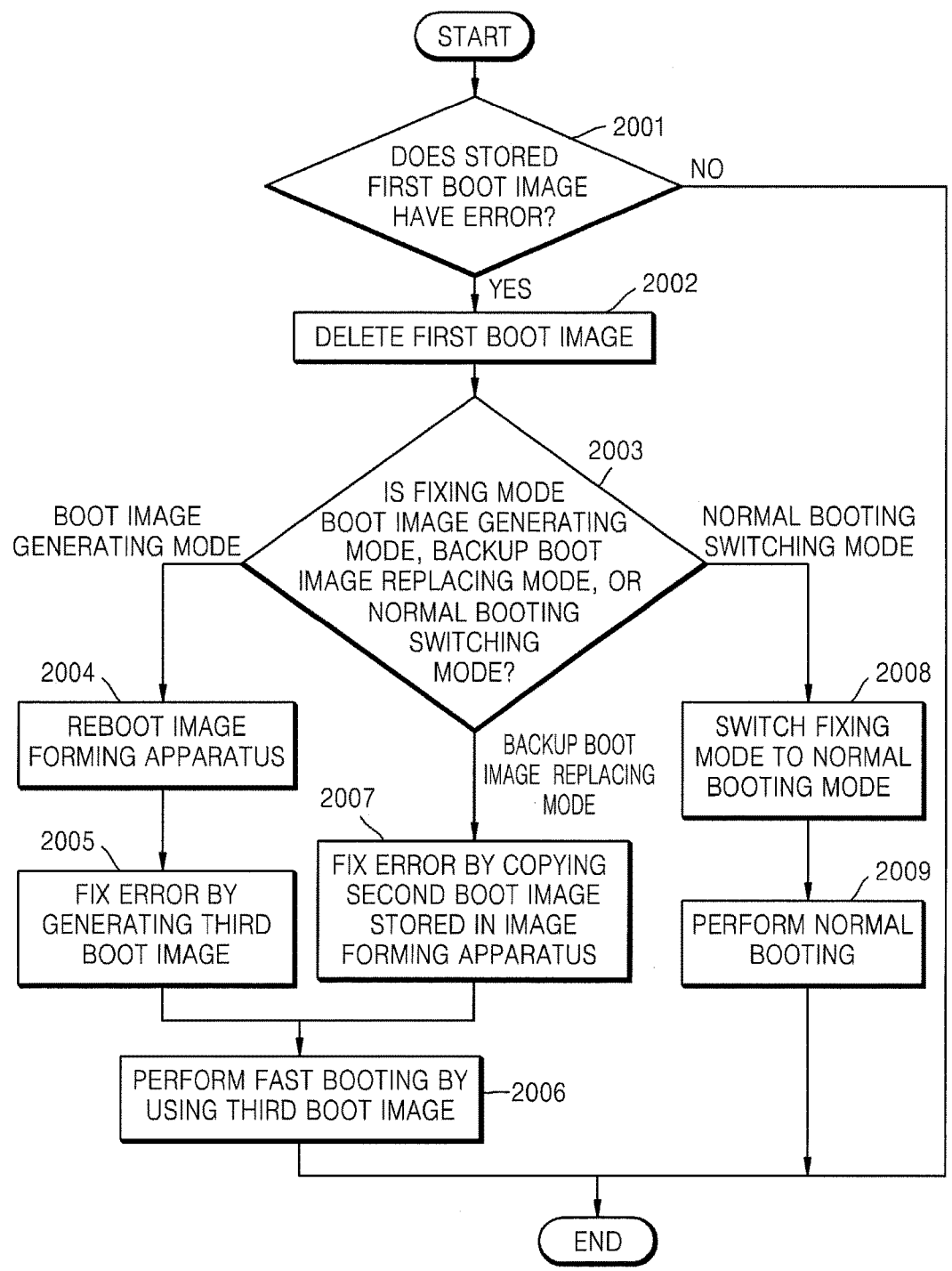
FIG. 20 is a detailed flowchart illustrating a method of fixing an error in a boot image to fast boot an image forming apparatus of FIG. 19.

FIG. 20 is a flowchart specifically illustrating a method of fixing an error in a boot image to fast boot the image forming apparatus 2 of FIG. 18, according to an embodiment. FIG. 20 may be a flowchart specifically illustrating the method of FIG. 19.

In operation 2001, when booting of the image forming apparatus 2 starts, the controller 110 determines whether a first boot image stored in the image forming apparatus 2 has an error. Operation 2001 corresponds to operation 206 of FIG. 2A. One of the following methods may be used to determine whether the first boot image has an error. If it is determined that the first boot image does not have an error, the method ends.

First, if fast booting using the first boot image is tried but fails to be performed within a predetermined time, then the controller 110 may determine that the first boot image has an error. To this end, before the first boot image is loaded, the controller 110 may check a flag indicating a previous booting state. If it is determined that fast booting was performed to an extent at least to which fast booting should be performed, then the controller 110 may store the flag to reflect the determination.

Second, if the image forming apparatus 2 is not restored to a system state defined in the first boot image, then the controller 110 may determine that the first boot image has an error.

Third, the controller 110 may compare a checksum for the first boot image with a previously stored checksum and determine that the first boot image has an error when the checksums are the same. If the checksums are different from each other, it is determined that the first boot image has an error. The checksum for the first boot image may be calculated using any of various methods of calculating particular values, e.g., parity bits, cyclic redundancy checking (CRC), and hash functions. If it takes a lot of time to calculate the checksum, then the controller 110 may calculate the checksum by selectively checking a header section, a particular section, or several little sections of the first boot image.

In operation 2002, if it is determined in operation 2001 that the first boot image has an error, then the controller 110 deletes the first boot image.

In operation 2003, the controller 110 determines a fixing mode to be used to fix the error. The fixing mode may include at least one from among the boot image generating mode, the backup boot image replacing mode, and the normal booting switching mode.

In operation 2004, if the determined fixing mode is the boot image generating mode, then the controller 110 controls the image forming apparatus 2 to be rebooted.

In operation 2005, the controller 110 fixes the error by controlling the boot image generator 120 to generate a third boot image. Operation 2001 corresponds to operation 210 of FIG. 2A.

In operation 2006, the booting unit 120 performs fast booting by using the third boot image.

In operation 2007, if the determined fixing mode is the backup boot image replacing mode, then the controller 110 fixes the error by copying a second boot image stored in the image forming apparatus 2. Here, the second boot image is a backup of the first boot image, stored at least one from among a point of time that the first boot image was generated and a point of time that fast booting was completed using the first boot. Since the second boot image is a backup of the first boot image, the first boot image and the second boot image may have the same information. Then, the method proceeds to operation 2006 and thus the booting unit 120 performs fast booting by using the second boot image.

In operation 2008, if the determined fixing mode is the normal booting switching mode, then the controller 110 switches the fixing mode to the normal booting mode without generating a boot image or replacing the first boot image with another boot image.

In operation 2009, the booting unit 120 performs normal booting.

Figure 21:
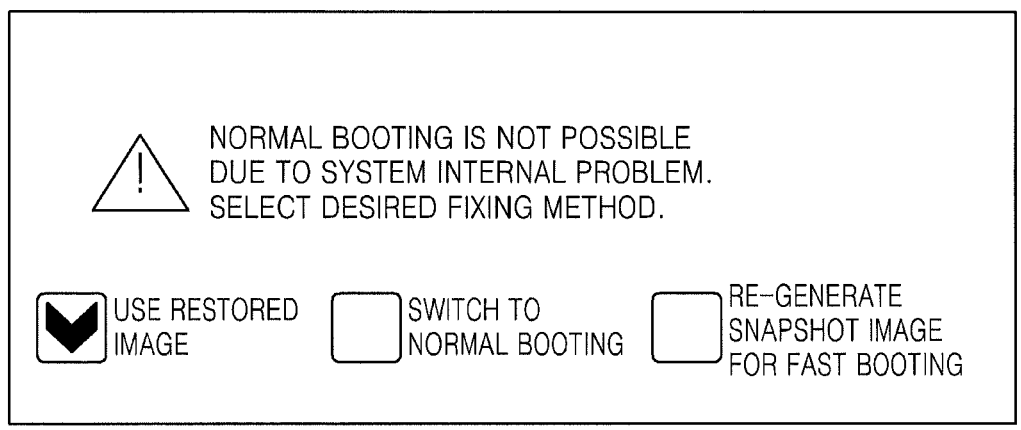
FIG. 21 illustrates an image that is displayed on a user interface unit and on which a desire fixing mode is selected, according to an embodiment.

FIG. 21 illustrates an image that is displayed on the user interface unit 30 of FIG. 1A or 1B and on which a desire fixing mode is selected, according to an embodiment. As described above, the fixing mode may include at least one from among the boot image generating mode, the backup boot image replacing mode, and the normal booting switching mode. The user interface unit 30 may display an image on which a desired fixing mode is selected and receive a user input regarding the selected fixing mode. Upon receiving the user input regarding the selected fixing mode via the user interface unit 30, the controller 110 fixes an error based on the selected fixing mode. According to another embodiment of the present general inventive concept, the user input regarding the selected fixing mode may be received by communicating with an external device connected to the image forming apparatus 2 via a network by using the network interface unit 40.

Referring back to FIG. 1B, when a boot image stored in the image forming apparatus 2 has an error, the error may be manually fixed by a user. More specifically, if the user recognizes the error in the boot image, then the user may fix the error according to any of various methods. For example, the user may directly fix the error by inputting a key in a particular pattern when the image forming apparatus 2 is booted. Otherwise, the user may fix the error by using a peripheral device, e.g., a USB device, before the boot image is loaded.

According to the above embodiments of the present general inventive concept, fast booting is performed based on a boot image. Thus, the speed of booting electronic products may be improved using software without causing a hardware change to the electronic products. Accordingly, a user may efficiently use an electronic product by reducing a booting time or increasing a booting speed.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While a few embodiments have been particularly shown and described with reference to drawings, it will be understood by those of ordinary skill in the art that various changes in form and details may be made therein without departing from the spirit and scope of the present disclosure, the scope of which is defined by the claims and their equivalents. These embodiments should be considered in a descriptive sense only and not for purposes of limitation.

What is claimed is:

1. A method of generating a boot image for fast booting an image forming apparatus, the method comprising:
   in response to a first power-on of the image forming apparatus, initializing a bootloader to begin booting of the image forming apparatus;
   detecting a hardware setting change in the image forming apparatus;
   in response to detecting the hardware setting change, displaying boot modes on a display of a user interface coupled to the image forming apparatus, the user interface to receive an input selecting one of the displayed boot modes, the displayed boot modes including a boot image generating mode and a normal boot mode; and
   in response to the input selecting the boot image generating mode:
      initializing, using at least one processor, an operating system and at least one application installed in the image forming apparatus,
      terminating processes that are not used to execute the operating system and the at least one application, from among processes that are performed when the initializing of the operating system and the at least one application is completed,
      suspending remaining processes performed in the image forming apparatus, and
      generating the boot image for fast booting while the remaining processes are suspended, the generated boot image for fast booting including information regarding a system state of the image forming apparatus;
   in response to a second power-on of the image forming apparatus, from a power-off condition of the image forming apparatus and subsequent to the first power-on of the image forming apparatus, performing fast booting by:
      initializing the bootloader,
      determining whether the generated boot image for fast booting has an error,
      in response to determining the generated boot image for fast booting does not have the error, loading the generated boot image for fast booting and restoring the image forming apparatus to the system state included in the generated boot image for fast booting before re-initializing the at least one application, and
      in response to determining the generated boot image for fast booting has the error:
         displaying fixing modes on the display of the user interface, the user interface to receive an input selecting one of the displayed fixing modes, the displayed fixing modes including the boot image generating mode, a backup boot image replacing mode, and a normal booting switching mode, and fixing the error according to the input selecting one of the displayed fixing modes by:

generating another boot image for fast booting when the user interface receives the input selecting the boot image generating mode from among the displayed fixing modes, retrieving a backup copy of the boot image for fast booting when the user interface receives the input selecting the backup boot image replacing mode from among the displayed fixing modes, and performing a normal booting when the user interface receives the input selecting the normal booting switching mode from among the displayed fixing modes.

2. The method of claim 1, wherein the information regarding the system state comprises data stored in a volatile memory and data stored in a central processing unit (CPU) register, which indicate information needed to boot the image forming apparatus while the remaining processes are suspended.

3. The method of claim 1, wherein the at least one application is an application for executing at least one function from among copying, printing, scanning, an address book, and a document box which are functions of the image forming apparatus.

4. The method of claim 1, wherein the terminating of the processes comprises terminating at least one process of a process that is not used in generating the boot image and a process that is performed within a predetermined time period.

5. The method of claim 1, further comprising unmounting at least one file system from among file systems used in the terminated processes and a file system that is not used in a job of generating the boot image, wherein the suspending of the remaining processes comprises suspending the remaining processes after the unmounting of the at least one file system.

6. The method of claim 5, wherein the unmounting of the at least one file system comprises:

if the initializing of the operating system is completed, changing an attribute of the at least one file system to a read/write state; and unmounting the at least one file system based on the changed attribute.

7. The method of claim 6, further comprising, if the generating of the boot image ends, changing the attribute of a file system related to the operating system to a read only state from among the at least one file system, the attribute of which is changed.

8. The method of claim 1, further comprising, if the terminating of the processes that are not used in the operating system and the at least one application is completed, initializing a space for storing the boot image.

9. The method of claim 1, further comprising:

suspending a peripheral device of the image forming apparatus when the initializing of the operating system and the at least one application ends; and storing peripheral component interconnect (PCI) state information of the image forming apparatus, wherein the information regarding the system state comprises the PCI state information.

10. The method of claim 1, wherein the initializing of the operating system and the at least one application comprises initializing the at least one application by initializing all data and threads related to the at least one application.

11. The method of claim 1, wherein the initializing of the operating system and the at least one application comprises initializing the at least one application by selectively initializing data and a thread that are not changeable by a user from among data and threads related to the at least one application.

12. At least one non-transitory computer readable recording medium storing computer readable instructions which when executed control at least one processor to implement a method of generating a boot image for fast booting an image forming apparatus, the method comprising:

in response to a first power-on of the image forming apparatus, initializing a bootloader to begin booting of the image forming apparatus;

detecting a hardware setting change in the image forming apparatus;

in response to detecting the hardware setting change, displaying boot modes on a display of a user interface coupled to the image forming apparatus, the user interface to receive an input selecting one of the displayed boot modes, the displayed boot modes including a boot image generating mode and a normal boot mode; and in response to the input selecting the boot image generating mode:

initializing, using at least one processor, an operating system and at least one application installed in the image forming apparatus, terminating processes that are not used to execute the operating system and the at least one application, from among processes that are performed when the initializing of the operating system and the at least one application is completed, suspending remaining processes performed in the image forming apparatus, and generating the boot image for fast booting while the remaining processes are suspended, the boot image for fast booting including information regarding a system state of the image forming apparatus, in response to a second power-on of the image forming apparatus, from a power-off condition of the image forming apparatus and subsequent to the first power-on of the image forming apparatus, performing fast booting by:

initializing the bootloader, determining whether the generated boot image for fast booting has an error, in response to determining the generated boot image for fast booting does not have the error, loading the generated boot image for fast booting and restoring the image forming apparatus to the system state included in the generated boot image for fast booting before re-initializing the at least one application, and in response to determining the generated boot image for fast booting has the error:

displaying fixing modes on the display of the user interface, the user interface to receive an input selecting one of the displayed fixing modes, the displayed fixing modes including the boot image generating mode, a backup boot image replacing mode, and a normal booting switching mode, and fixing the error according to the input selecting one of the displayed fixing modes by:

generating another boot image for fast booting when the user interface receives the input selecting the boot image generating mode from among the displayed fixing modes, retrieving a backup copy of the boot image for fast booting when the user interface receives the input selecting the backup boot image replacing mode from among the displayed fixing modes, and performing a normal booting when the user interface receives the input selecting the normal booting switching mode from among the displayed fixing modes.

13. An image forming apparatus for generating a boot image for fast booting, the apparatus comprising:

a user interface having a display;

a processor to:

initialize a bootloader to begin booting of the image forming apparatus in response to a first power-on of the image forming apparatus, detect a hardware setting change in the image forming apparatus, in response to detecting the hardware setting change, cause the user interface to display boot modes on the display of the user interface, the user interface to receive an input selecting one of the displayed boot modes, the displayed boot modes including a boot image generating mode and a normal boot mode, in response to the input selecting the boot image generating mode:

initialize an operating system and at least one application installed in the image forming apparatus, terminate processes that are not used to execute the operating system and the at least one application from among processes that are performed when the initializing of the operating system and the at least one application is completed, suspend the remaining processes performed in the image forming apparatus, and generate the boot image for fast booting while the remaining processes are suspended, the generated boot image for fast booting including information regarding a system state of the image forming apparatus, in response to a second power-on of the image forming apparatus, from a power-off condition of the image forming apparatus and subsequent to the first power-on of the image forming apparatus, perform fast booting by:

initializing the bootloader, determining whether the generated boot image for fast booting has an error, in response to determining the generated boot image for fast booting does not have the error, loading the generated boot image for fast booting and restoring the image forming apparatus to the system state included in the generated boot image for fast booting before re-initializing the at least one application, and in response to determining the generated boot image for fast booting has the error:

displaying fixing modes on the display of the user interface, the user interface to receive an input selecting one of the displayed fixing modes, the displayed fixing modes including the boot image generating mode, a backup boot image replacing mode, and a normal booting switching mode, and fixing the error according to the input selecting one of the displayed fixing modes by:

generating another boot image for fast booting when the user interface receives the input selecting the boot image generating mode from among the displayed fixing modes, retrieving a backup copy of the boot image for fast booting when the user interface receives the input selecting the backup boot image replacing mode from among the displayed fixing modes, and performing a normal booting when the user interface receives the input selecting the normal booting switching mode from among the displayed fixing modes; and a nonvolatile memory to store the generated boot image and to store the backup copy of the boot image for fast booting.

14. The apparatus of claim 13, wherein the information regarding the system state comprises data stored in a volatile memory and data stored in a central processing unit (CPU) register, which indicate information needed to boot the image forming apparatus while the remaining processes are suspended.

15. The apparatus of claim 13, wherein the processor terminates at least one process of a process that is not used in generating the boot image and a process that is performed within a predetermined time period.

16. The apparatus of claim 13, wherein the processor unmounts at least one file system from among file systems used in the terminated processes and a file system that is not used in a job of generating the boot image, and suspends the remaining processes after the unmounting of the at least one file system.

17. The apparatus of claim 13, wherein if the terminating of the processes that are not used in the operating system and the at least one application is completed, the processor initializes a space of the nonvolatile memory for storing the boot image.

18. The method of claim 1, further comprising, upon completion of the terminating of the processes that are not used in the operating system and the at least one application, initializing a first partition and a second partition for storing the generated boot image, wherein the first partition stores fixed information which corresponds to information which is not changeable by the user, and the second partition stores variable information of the at least one application which is changeable by the user.

19. The method of claim 18, wherein the fixed information includes at least one of data regarding a general operating system and firmware data, and the variable information includes at least one of job history information, account information, address book information, system options set by the user, and documents stored by the user.

20. The method of claim 1, wherein a time needed to activate an image forming function of the image forming apparatus by performing fast booting using the generated boot image for fast booting is less than a time needed to activate the image forming function of the image forming apparatus by performing normal booting in the normal boot mode.

21. The method of claim 1, wherein in response to determining the generated boot image for fast booting has the error deleting the generated boot image.

* * * * *